United States Patent [19]

Tobise et al.

[11] Patent Number: 5,565,945
[45] Date of Patent: Oct. 15, 1996

[54] LENS-FITTED PHOTOGRAPHIC FILM UNIT WITH FILM WINDING MOTOR

[75] Inventors: Manabu Tobise; Hirokazu Yokoo; Junichi Takagi; Hisashi Tasaka, all of Kanagawa, Japan

[73] Assignee: Fuji Photo Film Co., Ltd., Kanagawa, Japan

[21] Appl. No.: 412,532

[22] Filed: Mar. 15, 1995

[30] Foreign Application Priority Data

Mar. 22, 1994 [JP] Japan .................................. 6-050347
Mar. 25, 1994 [JP] Japan .................................. 6-055510

[51] Int. Cl.⁶ .................................................. G03B 1/18
[52] U.S. Cl. ........................... 396/6; 396/418; 396/301
[58] Field of Search ........................... 354/173.1, 288, 354/484

[56] References Cited

U.S. PATENT DOCUMENTS

Re. 32,558 12/1987 Chan .................................. 354/173.1

Primary Examiner—David M. Gray
Attorney, Agent, or Firm—Young & Thompson

[57] ABSTRACT

A lens-fitted photographic film unit is provided with a motor for rotating a spool to wind up photographic film one frame after each exposure. The motor is supplied with a single cell which may be commonly used for charging a flash unit. The rotational movement of the motor is transmitted to the spool through a speed-reduction gear mechanism which reduces the rotational speed at ratios between 100:1 and 280:1. The motor and the gear mechanism are removably mounted in a frame as a motor unit, and the motor unit is removably attached to a main body of the film unit beside a take-up chamber. Forwardly convex contacting portions are exposed to a front portion of the motor unit. The cell is mounted between contact plates having forwardly convex contacting portions. A motor drive switch for controlling start and stop of the motor also has forwardly convex contacting portions exposed to a front side thereof. These contacting portions are pressed against conductive layers formed on the inner surface of a front cover of the film unit so as to provide a film winding circuit.

27 Claims, 19 Drawing Sheets

LENS-FITTED PHOTOGRAPHIC FILM UNIT WITH FILM WINDING MOTOR

BACKGROUND OF THE INVENTION

1. Field of the Invention

The present invention relates to a lens-fitted photographic film unit, more particularly to a lens-fitted photographic film unit with a built-in motor for automatic film winding.

2. Background Art

Low price lens-fitted photographic film units, hereinafter called simply film units, have been widely known, each of which is pre-loaded with an ISO-135 type photographic film cassette and has a simple photographic mechanism so that anyone can enjoy photography with ease. Since the film units are compact and handy, and mostly have a flash unit, the users can enjoy photography wherever and whenever they want. Since the pre-loaded photographic film is wound into a light-tight cassette shell one frame after each exposure, the user has only to forward the film unit to a photofinisher after the photographic film is completely exposed, without the need for rewinding the exposed photographic film nor removing the film cassette from the unit body.

After the film cassette to be developed and printed is removed from the unit body in a photo-lab or a retail photo-lab agency, the unit body is collected by a film unit manufacture for recycling. For example, a picture-taking unit having a taking lens, a shutter mechanism, a film winding mechanism and the like incorporated therein, and the flash unit are reused in a film unit, after passing various inspections. Not-reusable parts made from plastic resins are melted to be recycled as plastic resin materials.

While one exposed frame of the photographic film is wound into the cassette shell by rotating a spool of the cassette through a film winding wheel, a sprocket wheel whose sprockets are engaged in perforations of the photographic film makes one revolution. When the exposed frame of the photographic film has been wound into the cassette shell, a cam member rotating coaxially and together with the sprocket wheel causes a shutter actuating lever to move to a cocked position and also causes an arresting lever to arrest the shutter actuating lever in the cocked position and, simultaneously, lock the cam member. Accordingly, the next exposure is not enabled unless the film winding wheel is rotated to wind up the exposed frame. If the photographer forgets to wind up the exposed frame, the photographer may miss a desirable chance for taking a picture.

Using a motor for automatic film winding in the film unit as in a compact camera will eliminate such a problem and also facilitate photographing. In a conventional compact camera, a motor is disposed inside a take-up spool. The motor rotates the take-up spool to wind up a photographic film one frame at a time, and also drives a shaft through a gear mechanism to rotate a spool of a film cassette when rewinding the exposed film into the cassette shell. The compact camera further has a main switch for turning a power source of the camera ON and OFF, a switch which is turned ON when a shutter release is complete, and is turned OFF when the shutter is cocked. The compact camera also has a switch which is switched OFF so long as the shutter button is depressed, and is turned ON when the shutter button is not depressed. These switches are connected in series with the motor so that the motor is driven when all these switches are turned ON. Since the single motor should drive both the take-up spool and the shaft for the cassette spool in the compact camera, and it is necessary to consider voltage drop caused by contact resistance of these switches, the power source needs to supply the motor with a voltage of not less than 3 V.

Since the low price is one of the strong point of the film unit, if the film winding motor is to be incorporated into the film unit, the motor and its power source must be inexpensive. As an inexpensive power source for supplying 3 V voltage or more, two or more dry cells, e.g., size AA or A type alkali-manganin or manganin 1.5 V batteries, may be used. However, loading more than one dry cell needs to enlarge the size of the unit body and reduces its portability. This is undesirable in view of the nature of the film unit. A button cell or a lithium cell pack could minimize the unit body, but too expensive to use in the film unit. If may be possible to drive the motor by a single dry cell, but the speed of the motor and hence the film winding speed would be low, and still be lowered by the voltage drop due to contact resistance of switches.

Beside that, in order to automatically or electrically wind the photographic film one frame at a time in cooperation with the above-described conventional film winding mechanism wherein the sprocket wheel and the cam member are locked upon one-frame advance of the photographic film, the film winding motor must stop concurrently with the lock of the sprocket wheel. If the motor rotates the spool of the cassette by inertia after the lock of the sprocket wheel, the photographic film would be tensed to be biased toward the spool. When the shutter is released and thus the sprocket wheel is unlocked under this condition, the photographic film would slightly move toward the spool during the exposure, resulting in an blurred photograph.

Furthermore, since the film unit is expected to be recycled, the film winding motor must be easy to assemble and disassemble in term of production cost and efficiency and reusability. One problem in assembling and disassembling the motor is wiring or connection between the motor and the power source and switches for controlling the operation of the motor. Wiring with leads and solder takes much time and is unsuitable for disassembling and reassembling, and also contradict the compactness of the film unit.

OBJECTS OF THE INVENTION

The present invention is made to solve the above problems, and an object of the invention is to provide a film unit with a film winding motor, which is compact and handy, and can be manufactured at a low cost.

Another object of the invention is to provide a film unit with a film winding motor which is easy to assemble and disassemble and thus suitable for recycling.

SUMMARY OF THE INVENTION

To achieve the above objects, the present invention provides a speed-reduction gear mechanism between a motor and a winding gear which is coupled to the spool of the cassette. Since the speed-reduction gear mechanism transmits the driving power of the motor while reducing the rotational speed of the motor and thus increasing torque supplied to the winding gear, the driving power of the motor can be small and thus a single cell can be enough to drive the motor to reliably rotate the spool to wind up the photographic film. Therefore, the film unit of the present invention can be small and compact.

Also, the present invention provides a motor unit which is removably attachable to a front portion of the main body, and has a pair of contacting portions connected to the motor and protruding forwardly of the motor unit. Also a pair of contact plates for the cell are mounted to a front portion of the main body, and have contacting portions which protrude forwardly of the main body. The motor and the cell are connected through conductive layers which are formed on the inner surface of the front cover so as to be in contact with the contacting portions only when the front cover is attached to the front of the main body. Therefore, there is no need for lead wires and soldering to provide a film winding circuit.

According to a preferred embodiment, a motor drive switch for controlling start and stop of the motor in synchronism with a picture-taking mechanism is connected in the film winding circuit through contacting portions protruding forwardly of the main body so as to be in contact with the conductive layers.

The motor drive switch is preferably actuated by an arresting lever of the picture-taking mechanism which may have the same construction as those used in conventional film units, wherein the arresting lever rotates in a first direction to release a shutter actuating lever from a cocked position to make an exposure upon depression of a shutter button, and rotates in a second direction to arrest the shutter actuating lever in the cocked position when the photographic film has been wound into the cassette shell. In this way, the film unit with the film winding motor of the prevent invention can be assembled by using the same fundamental parts as the conventional film unit so that the production cost may be restrained.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DETAILED DESCRIPTION OF THE PREFERRED EMBODIMENTS

Figure 1:
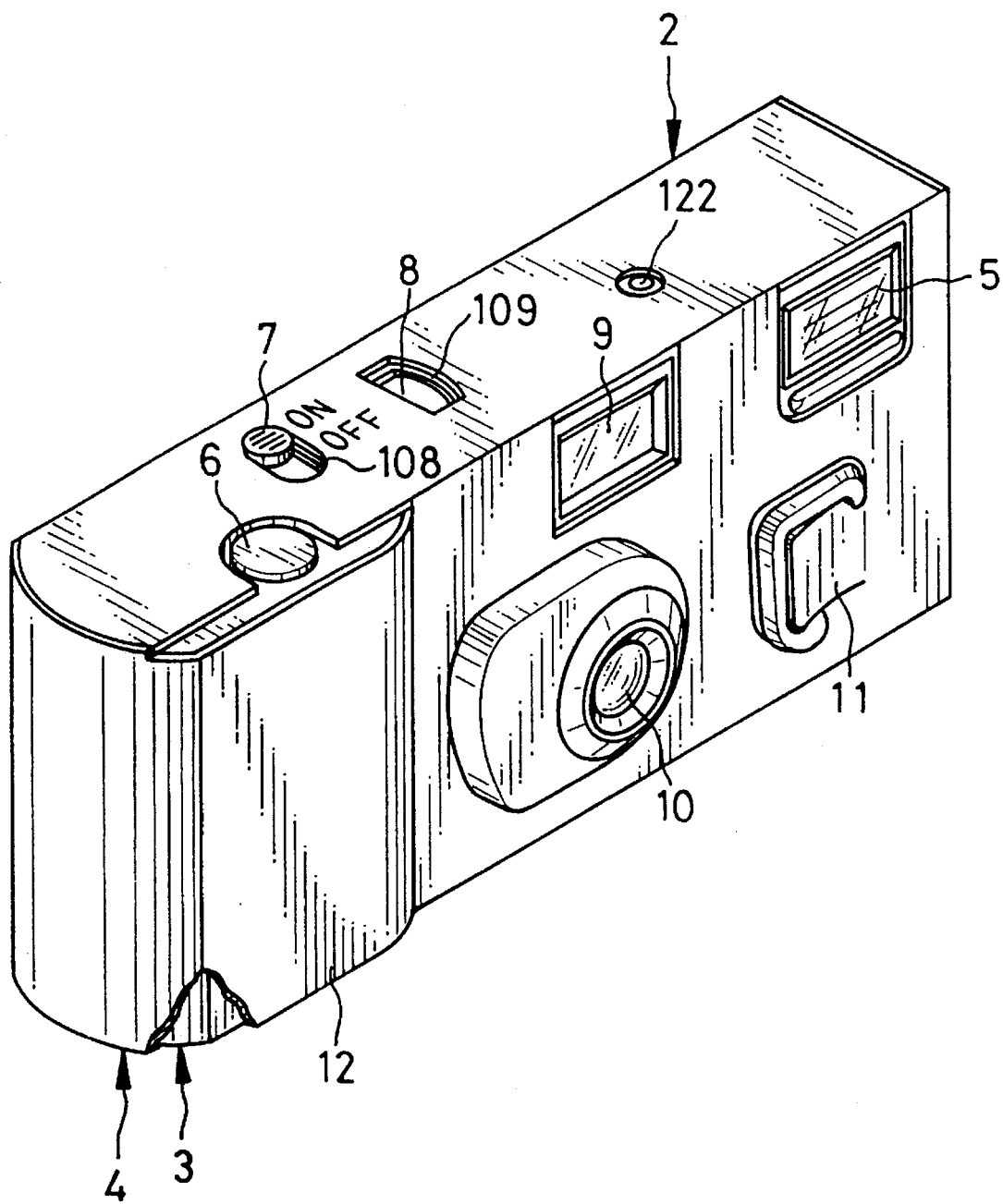
FIG. 1 is a perspective view of a film unit according to a preferred embodiment of the invention.

FIG. 1 shows a film unit 2 according to a preferred embodiment of the invention, which is constituted of a unit body 3 packed in an outer case 4. The outer case 4 has instructions and information about the film unit 2 printed thereon, and openings and cut-outs for exposing a flash light emitting portion 5, a shutter button 6, a main switch knob 7, a frame counter dial 8, a viewfinder 9, a taking lens 10, a flash charge switch 11 and so force to the outside. Characters "ON" and "OFF" are printed on opposite sides of the main switch knob 7 to indicate ON and OFF positions, respectively. A grip 12 is formed below the shutter button 6, for stable gripping of the film unit 2. The grip 12 protrudes forwardly of other front wall portions of the film unit.

Figure 2:
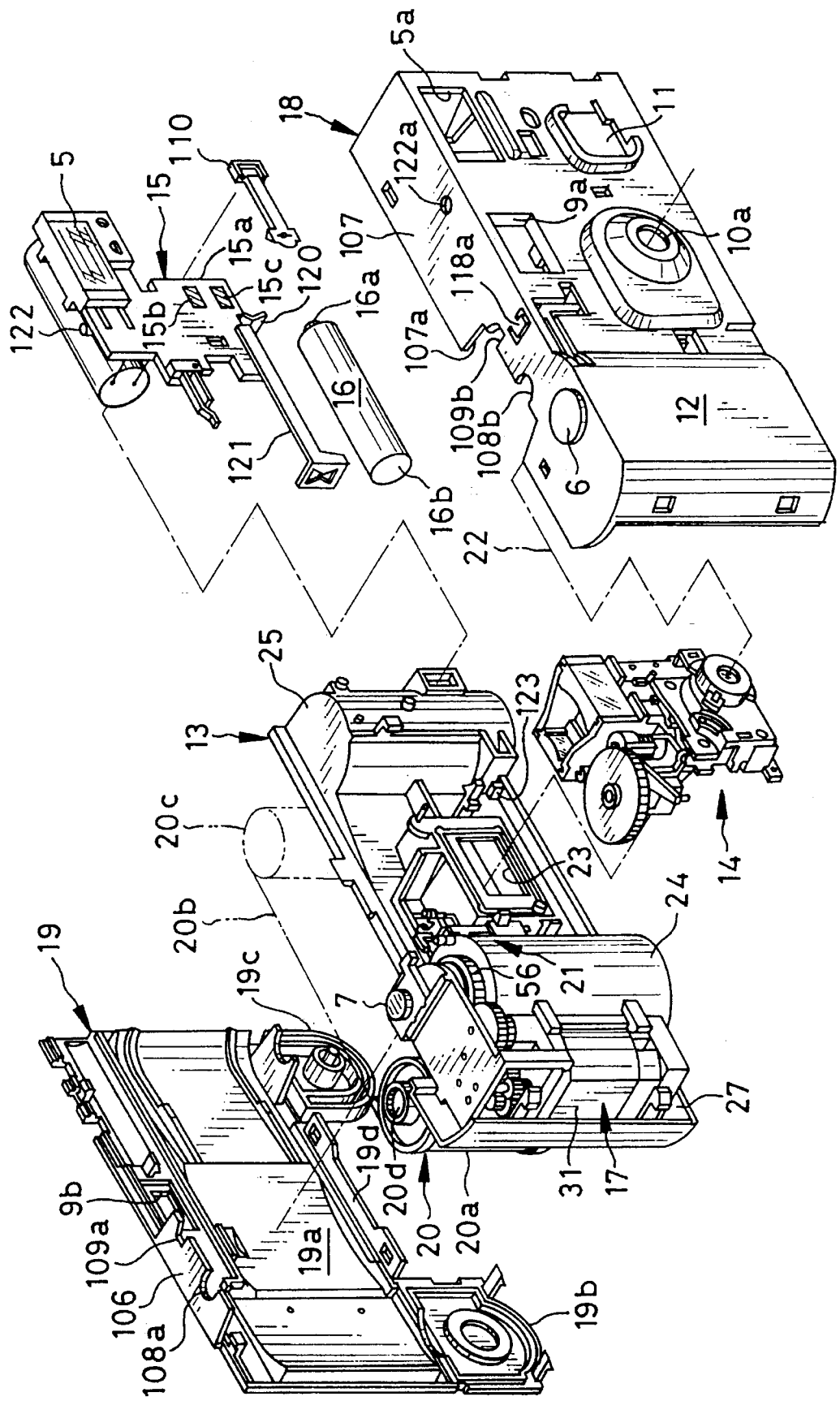
FIG. 2 is an exploded perspective view of a unit body of the film unit shown in FIG. 1.

As shown in FIG. 2, the unit body 3 is constituted of a main body 13, a picture-taking unit 14, a flash unit 15, a cell 16, e.g., a dry cell of 1.5 V, a motor unit 17 having a motor 31 and a speed-reduction gear mechanism 32 assembled therein (FIG. 3), a front cover 18, a rear cover 19, a photographic film cassette 20, and a motor drive switch 21, which are removably assembled through snap-in engagements.

The main body 13 has a rectangular exposure opening 23 formed coaxially with an optical axis 22 of the taking lens 10, a cassette chamber 24 for accommodating a cassette shell 20a, and a film roll chamber 25 for accommodating unexposed photographic film 20b in form of a roll 20c which is previously withdrawn from the cassette shell 20a and is wound in the roll 20c. The film roll chamber 25 has a smaller diameter than the cassette chamber 24, so that the front wall portion of the cassette chamber 24 protrudes forward corresponding to the grip 12. A rectangular exposure aperture defining the exposure area of the photographic film 20b is formed behind the exposure opening 23 but is not shown for clarity.

Figure 3:
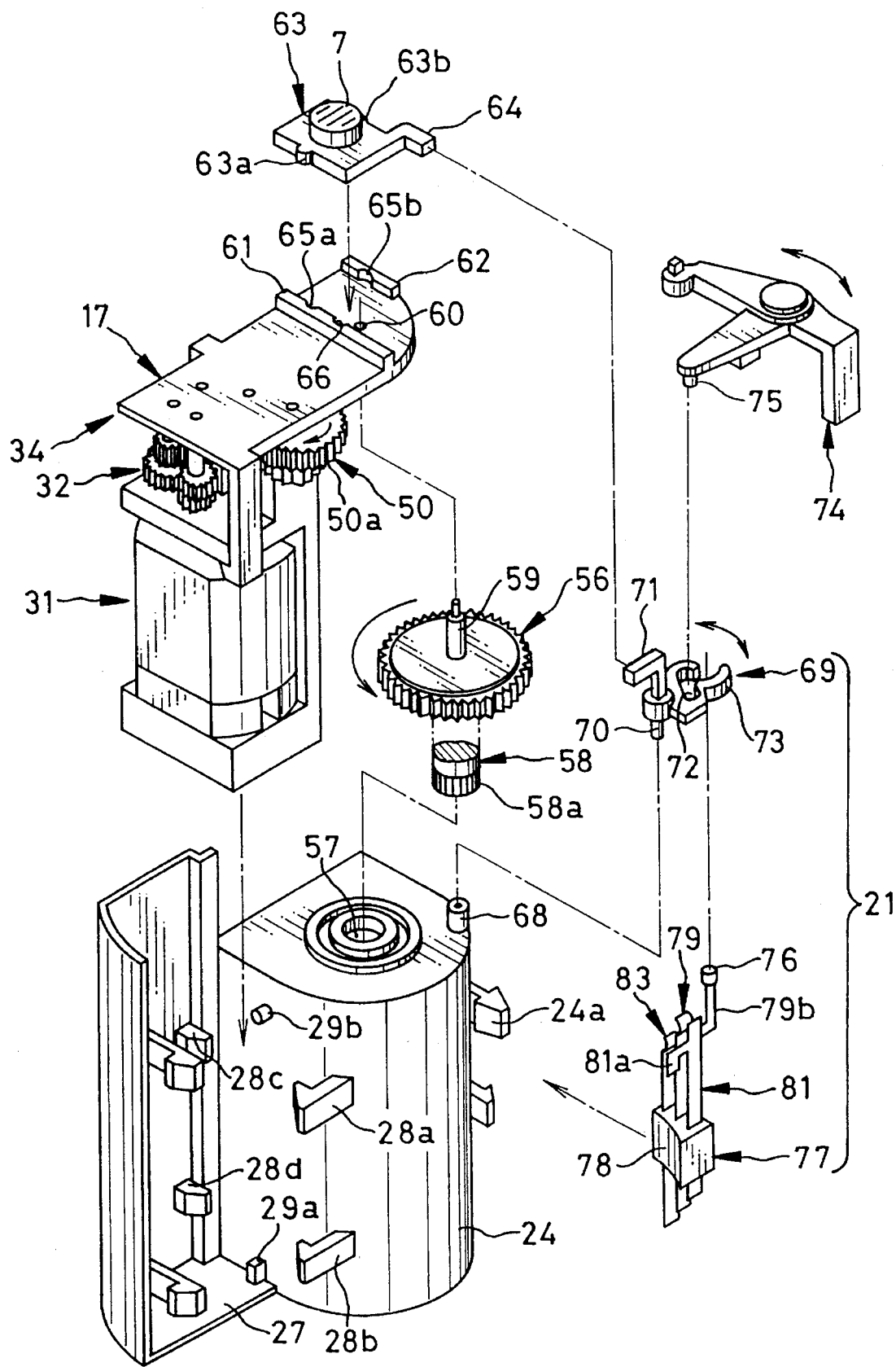
FIG. 3 is an exploded fragmentary perspective view illustrating a film winding mechanism of the film unit shown in FIG. 1.

As shown in FIG. 3, the motor unit 17 is received in a motor unit chamber 27 which is integrally formed on the left end of the main body 13 beside the cassette chamber 24, in FIG. 2. The motor unit 17 may be inserted from the top or the front of the motor unit chamber 27, and is secured through hooks 28a, 28b, 28c and 28d formed on the left side of the cassette chamber 24. The fronts of the motor unit chamber 27 and the cassette chamber 24 are covered with the grip 12 which is integrally formed with the front cover 18.

Figure 4:
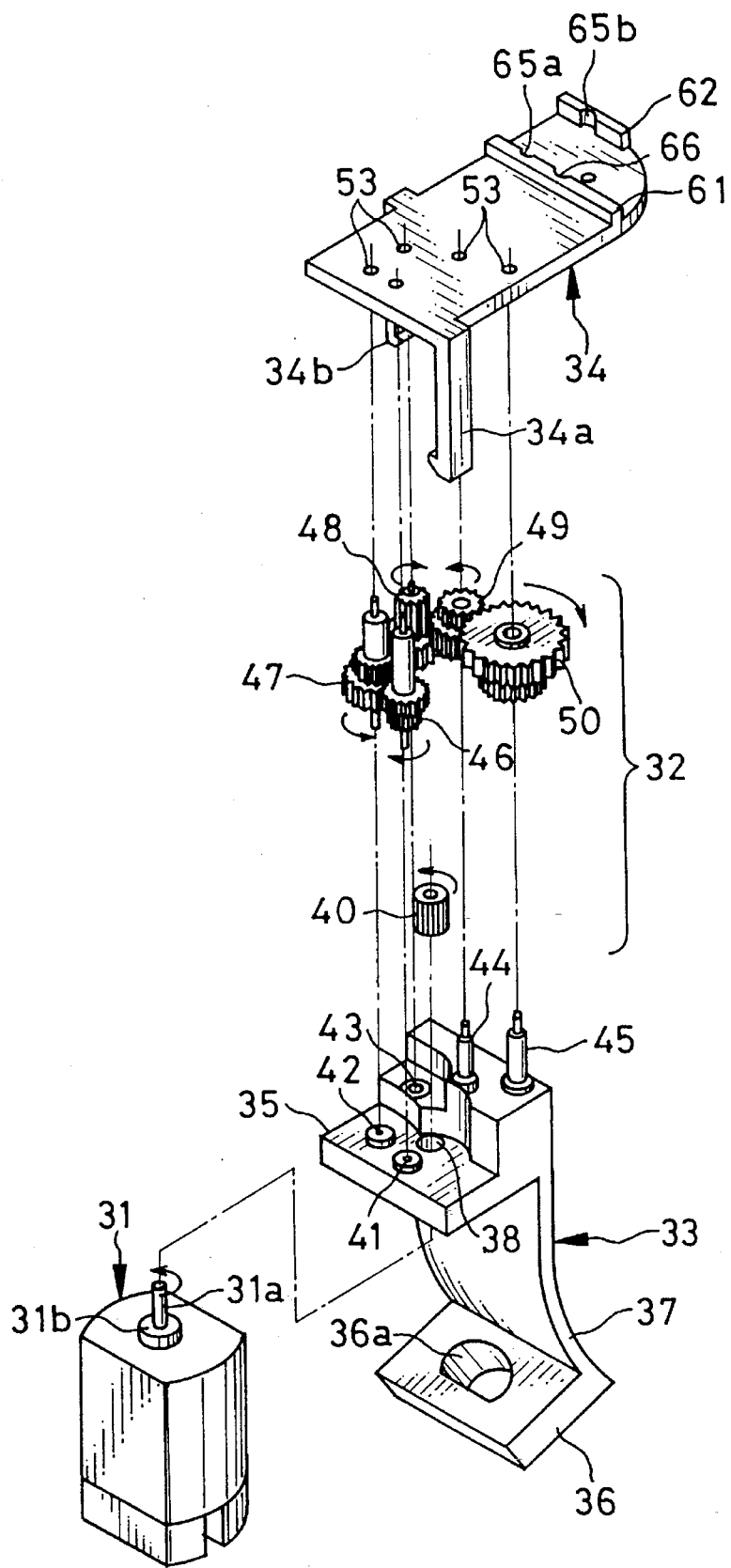
FIG. 4 is an exploded perspective view of the motor unit shown in FIG. 3.

As shown in FIG. 4, the motor unit 17 is constituted of the motor 31, the speed-reduction gear mechanism 32 for transmitting the rotational movement while decelerating it, a frame 33 for holding the motor 31 and the gear mechanism 32, and a top plate 34 which holds the gear mechanism 32 onto the frame 33. The frame 33 has an upper and lower supporting portions 35 and 36, which are connected to each other through a resilient connecting portion 37. The hooks 28a to 28d formed in the motor unit chamber 27 catch the motor unit 17 at the connecting portion 37. The motor 31 may be such a cheap motor that has been used as a power source in a miniature vehicle or the like. When mounting the motor 31 in the frame 33, the connecting portion 37 of the frame 33 is bent as shown in FIG. 4, and a shaft 31a of the motor 31 is inserted from the bottom into a hole 38 which is formed through the upper supporting portion 35. At that time, a head portion 31b of the motor 31 is fitted in a recess which is not shown but is formed on the bottom side of the supporting portion 35. The lower supporting portion 36 has a hole 36a formed through, in which a projection formed on the bottom side of the motor 31 and having the same shape as the hole 36a is fitted when the frame 33 resiliently returns to the initial position as shown in FIG. 3. Thus, the motor 31 is secured to the frame 33.

The shaft 31a protrudes upward through the hole 38 to securely mount a gear 40 of the gear mechanism 32 thereon. The upper supporting portion 35 also has bearing holes 41, 42 and 43 and axles 44 and 45 for rotatably mounting gear members 46, 47, 48, 49 and 50 of the gear mechanism 32, respectively. These gear members 46 to 50 are two-step gears, each constituted of upper and lower spur gears having different diameters, which mesh with one another so as to decelerate the rotational movement from the motor 31.

The top plate 34 has a couple of hooks 34a and 34b extending downwards which are engaged with opposite edges of the upper supporting portion 35 to secure the top plate 34 to the frame 33. Then, the upper tips of the gear members 46 to 48 and the axles 44 and 45 are inserted in five holes 53 formed through the top plate 34, so that the gear members 46 to 50 are maintained appropriately spaced from one another, and the rotational movement of the motor 31 is stably transmitted.

Referring again to FIG. 3, a winding gear 56 is rotatably mounted in a bearing hole 57 formed through the top wall of the cassette chamber 24, such that a drive shaft 58 formed on the bottom side of the winding gear 56 is inserted through the bearing hole 57 into a spool 20d of the cassette shell 20a. By virtue of teeth 58a formed around the outer periphery of the drive shaft 58, the spool 20d having corresponding teeth around the inner periphery thereof is rotatable together with the winding gear 56.

An axle 59 is formed on the top side of the winding gear 56. The axle 59 is inserted through a hole 60 of the top plate 34 when the motor unit 17 is secured to the main body 13. Concurrently, the winding gear 56 comes into mesh with the lower gear 50a of the gear member 50 of the motor unit 17, wherein the spacing between the axes of the gears 56 and 50 is maintained constant. In this way, the rotational movement of the motor 31 is transmitted to the spool 20d while the speed being reduced to 1/100 to 1/280.

The above mentioned range of reduction ratio from 100:1 to 280:1, provided through the gear mechanism 32, is determined according to the following formulas:

Deceleration number = necessary film winding torque / motor shaft load torque × gear efficiency   (1)

Motor rotational speed (rpm) = 8700 − 510 × motor shaft load torque   (2)

Time for winding one frame (sec.) = number of revolution of spool per frame / number of revolution of spool per unit time = number of revolution of spool per frame / (motor rotational speed × 1/60 × 1/deceleration number)   (3)

First, a minimum deceleration number is determined. "Necessary film winding torque" means a torque necessary for winding the photographic film. The necessary film winding torque is determined to be 700 gfcm, by measuring film winding torque taken for winding up a first exposed frame, which is disposed in a trailing end of the photographic film in the film unit, at a low temperature (−10° C.), that is, when the largest torque is necessary for winding.

The above equation (2) shows a relationship between the rotational speed (rpm) of a cheap motor and the load torque of the motor shaft, which is obtained based on actual measurement values. The maximum value of the motor shaft load torque is usually a half of a brake torque, that is, the torque when the motor rotational speed is zero in the equation (2). Accordingly, the maximum motor shaft load torque may be 8.5 gfcm.

Since the number of gears is limited to four to eight in the film unit in view of compactness, and there is a 5% loss between the gears, gear efficiency is $0.95^4 = 0.82$ when the number of gears is five. Substituting the above values of the necessary winding torque, the motor shaft load torque and the gear efficiency into the equation (1), the minimum reduction ratio is determined to be 100:1. If the minimum reduction ratio is set less than 100:1, the less time would be taken for winding up one frame, but the motor shaft load torque would be too large to ensure a stable film winding operation.

The maximum reduction ratio is determined according to the equation (3). Time for winding one frame may be 3 seconds in this instance when the film unit is under normal operating condition. Since the spool 20d initially has a small length of the photographic film 20b wound thereon, the diameter of the roll wound on the spool 20d is the smallest, so that the number of revolution of the spool 20d necessary for winding up the first exposed frame is the smallest. Providing that the diameter of the roll initially wound on the spool 20d is 11.5 mm, and that each frame has a length of 36 mm and is spaced 2 mm from each other in the longitudinal direction, the minimum number of revolution of the spool per frame is 1.05 which may be calculated by dividing the circumference 11.5π (mm) by 36+2 (mm).

The motor shaft load torque is set at 5 gfcm in order to maintain the rotational speed in a stable range relative to the load. Substituting the above values of the time for winding one frame, the number of revolution of the spool per frame and the motor shaft load torque into the equations (2) and (3), the maximum reduction ratio is determined to be 290:1.

The top plate 34 has a pair of ridges 61 and 62 on the right end portion thereof in FIG. 3, which extend parallel to the optical axis 22 of the taking lens 10. An operation plate 63, on which the main switch knob 7 is integrally formed, is mounted between the ridges 61 and 62 to be slidable along the ridges 61 and 62. The operation plate 63 has a forwardly protruding operation arm 64. Also, a pair of clicks 63a and 63b are formed on right and left edges of the operation plate 63. When the main switch knob 7 is in the ON position, as shown in FIG. 1, the click 63a is engaged in a notch 65a of the ridge 61, and the click 63b is engaged in a notch 65b of the ridge 62. When the main switch knob 7 is moved in the OFF position (FIG. 5), the click 63a is engaged in a notch 66.

Figure 5:
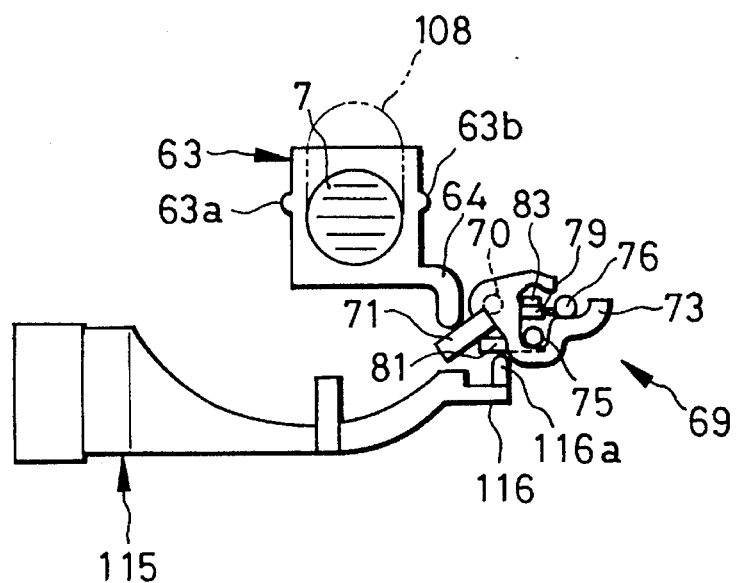
FIG. 5 is a top plan view illustrating the relationship between a switching lever and other members of the film winding mechanism in an OFF position of a main switch knob.

On the other hand, a bearing sleeve 68 is formed on the top of the cassette chamber 24 to rotatably mount a switching lever 69 therein. The switching lever 69 has a pivot 70, an L-shaped arm 71 protruding upward, an engaging portion 72 and a pushing arm 73 extending horizontally. The pivot 70 of the switching lever 69 is inserted in the bearing sleeve 68. The L-shaped arm 71 is arranged to be pushed by the operation arm 64 when the operation plate 63 is moved to the OFF position, as shown in FIG. 5, thereby causing the switching lever 69 to rotate in a counterclockwise direction. The engaging portion 72 is engaged with a pin 75 of an arresting lever 74 which is mounted in the picture-taking unit 14. The pushing portion 73 is in contact with a switching member 76 of a contact unit 77.

Figure 6:
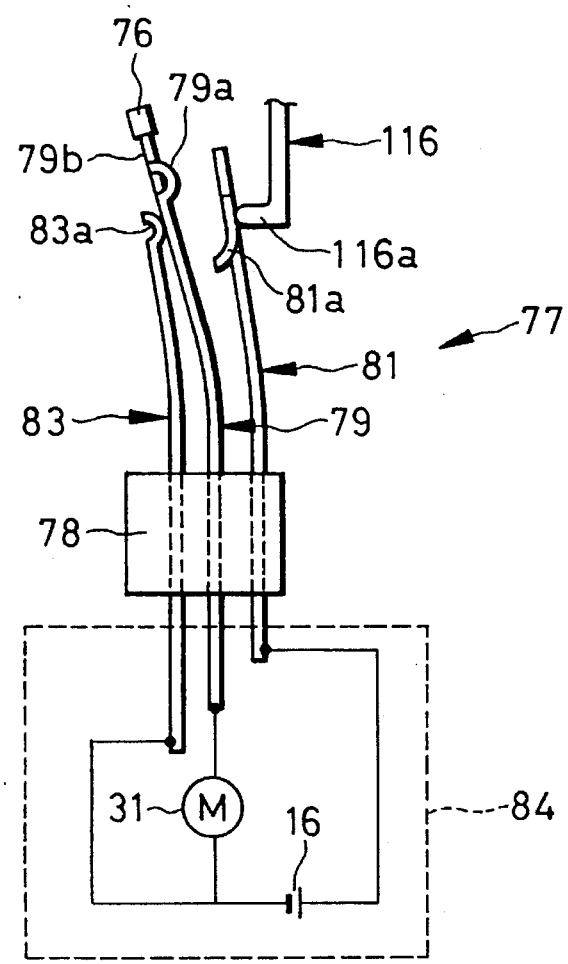
FIG. 6 is an explanatory view of a contact unit connected to a film winding circuit, in a position wherein the motor is short-circuited for braking.

As shown in FIGS. 3 and 6, the contact unit 77 is constituted of an isolating resin holder 78 and three contact strips 79, 81 and 83 whose base portions are securely and separately held in the holder 78. The contact unit 77 is removably attached to the main body through engagement between the holder 78 and hooks 24a. The first contact strip 79 has a semi-circular contacting portion 79a at its upper end, and an arm 79b branching from one side and extending upwards, as shown in FIG. 3. The above-mentioned switching member 76 is disposed at the free end or upper tip of the arm 79b. The switching member 76 is formed cylindrical from plastic material.

The second contact strip 81 is disposed in front of the first contact strip 79. A J-shaped arm 81a is branched from the second contact strip 81 on the opposite side to the arm 79b of the first contact strip 79. The free end or lower tip of the J-shaped arm 81a is curved toward the first contact strip 79. The third contact strip 83 is disposed behind the first contact strip 79. The third contact strip 83 also has a curved or semi-circular contacting portion 83a at its upper end. These contact strips 79, 81 and 83 are connected to the motor 31 and the cell 16 in a manner as shown by a film winding circuit 84 in FIG. 6. When the first contact strip 79 is brought into contact with the second contact strip 81, the motor 31 is connected to the cell 16 and activated. When, the first contact strip 79 is brought into contact with the third contact strip 83, the motor 31 is short-circuited and braked.

Figure 7:
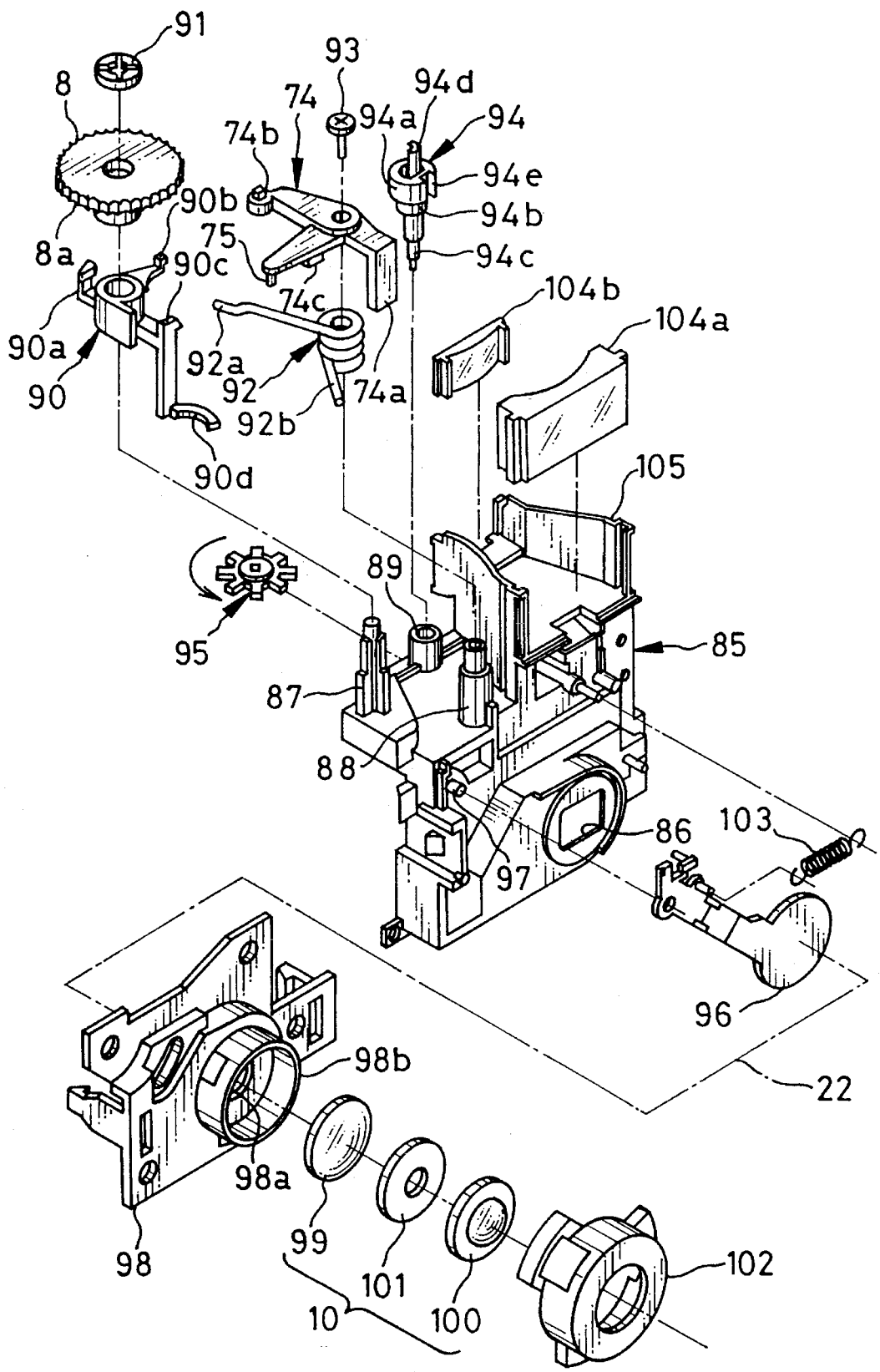
FIG. 7 is an exploded perspective view of a picture-taking unit of the film unit shown in FIG. 2.

FIG. 7 shows the picture-taking unit 14 wherein a base portion 85 has a shutter aperture 86 in a front portion coaxially with the optical axis 22, and axles 87 and 88 and a bearing sleeve 89 on a top portion thereof. A shutter actuating lever 90 and the frame counter disc 8 are rotatably mounted on the axle 87, and are secured by a snap ring 91. A spring 92 and the arresting lever 74 are rotatably mounted on the axle 88, and are secured by a screw 93. The bearing sleeve 89 receives a cam member 94.

The cam member 94 is constituted of a one-tooth gear 94d, a winding-stop cam 94a, a shutter cocking cam 94b and a bottom shaft 94c, which are arranged in this order from the top and are formed as an integral part. The bottom shaft 94c is coaxially fitted in a sprocket wheel 95 which is disposed inside the base portion 85, so that the cam member 94 rotates together with the sprocket wheel 95. The one-tooth gear 94d is engaged with teeth 8a formed around the periphery of the frame counter disc 8. The sprocket wheel 95 engages in perforations of the photographic film 20b, such that the sprocket wheel 95 makes one revolution while the photographic film 20b is advanced one frame by rotating the spool 20d through the winding gear 56.

An end 92a of the spring 92 is engaged with an engaging portion 90a of the shutter actuating lever 90 so as to urge the shutter actuating lever 90 to rotate counterclockwise about the axle 87. Another end 92b of the spring 92 is engaged with a downward arm 74a of the arresting lever 74 so as to urge the arresting lever 74 to rotate clockwise about the axle 88. The shutter cocking cam 94b is in contact with an end 90b of the shutter actuating lever 90 so as to cause the shutter actuating lever 90 to rotate clockwise against the force of the spring 92 when the sprocket wheel 95 is rotated.

The winding-stop cam 94a has an axial groove 94e, in which a claw 74b of the arresting lever 74 is trapped each time the cam member has made one revolution along with the one-frame advance or winding of the photographic film 20b. Thus, the sprocket wheel 95 is locked to stop film winding. Simultaneously, as a result of insertion of the claw 74b into the groove 94e, the arresting lever 74 slightly rotates clockwise. The, a bottom projection 74c of the arresting lever 74 comes into engagement with an upper projection 90c of the shutter actuating lever 90, to keep the shutter actuating lever 90 in a cocked position. While the sprocket wheel 95 makes one revolution, the one-tooth gear 94d advances the frame counter disc 8 by one unit.

When the arresting lever 74 rotates clockwise, the pin 75 causes the switching lever 69 to rotate counterclockwise in FIG. 3. Then, the switching member 76 of the first contact strip 79 is pushed backward to contact with the third contact strip 83, as shown in FIG. 6. As a result, the motor 31 is stopped at the moment when the sprocket wheel is locked.

A shutter blade 96 having a crank-shape is mounted pivotally about an axle 97 which is formed on the front of the base portion 85 parallel to the optical axis. A shutter cover 98 is mounted in front of the shutter blade 96 to prevent the shutter blade 96 from flattering in the direction of the optical axis 22. The shutter cover 98 has a stop-aperture 98a and a lens barrel 98b formed coaxially with the optical axis 22, as an integral part. Rear and front lens elements 99 and 100 and a spacer ring 101 disposed between these lens elements 99 and 100, which constitute the taking lens 10, are inserted in the lens barrel 98b, and is secured by a lens cover 102. The shutter blade 96 is urged by a spring 103 toward a closed position closing the shutter aperture 86, and is adapted to be displaced from the shutter aperture 86 when struck by a leg 90d of the shutter actuating lever 90.

On the upper right portion of the base portion 85, a channel-shaped lens frame 105 is integrally formed for holding an objective lens 104a and an eyepiece 104b which constitute an optical system of the viewfinder 9. The viewfinder 9 is an inverted Galilean viewfinder, and is disposed between an objective window 9a and an eyepiece window 9b which are formed through the front cover 18 and the rear cover 19, respectively.

As shown in FIG. 2, the rear cover 19 has a film supporting surface 19a in an area behind the exposure aperture, that is, behind the taking lens 10. The eyepiece window 9b is formed above the film supporting surface 19a. Bottom lids 19b and 19c are formed integrally with the rear cover 19 so as to close the bottoms of the cassette chamber 24 and the film roll chamber 25. The rear cover 19 also has a top wall portion 106 formed integrally on the top edge thereof and protruding forwardly thereof. The top wall portion 106 is fitted in a cut-out 107*a* of a top wall portion 107 of the front cover 18 when the front and rear covers 18 and 19 are attached to the main body 13. Then, a slot 108 for exposing the main switch knob 7 to the outside is formed by slot-halves 108*a* and 108*b* which are formed in the top wall portion 106 and the cut-out 107*a*, respectively. In the same way, a frame counter window 109 is formed by window-halves 109*a* and 109*b* which are formed in the top wall portion 106 and the cut-out 107*a*.

The front cover 18 is formed integrally with a lens aperture 10*a* for exposing the taking lens 10 to the outside, a flash window 5*a* for exposing the flash emitting portion 5 of the flash unit 15 to the outside, the finder objective window 9*a*, and the flash charge switch 11. A contact strip 110 is disposed behind the flash charge switch 11 such that the contact strip 110 connects a pair of contacts 15*b* and 15*c* on a printed circuit board 15*a* to charge the flash unit 15 while the flash charge switch 11 is depressed.

Figure 8:
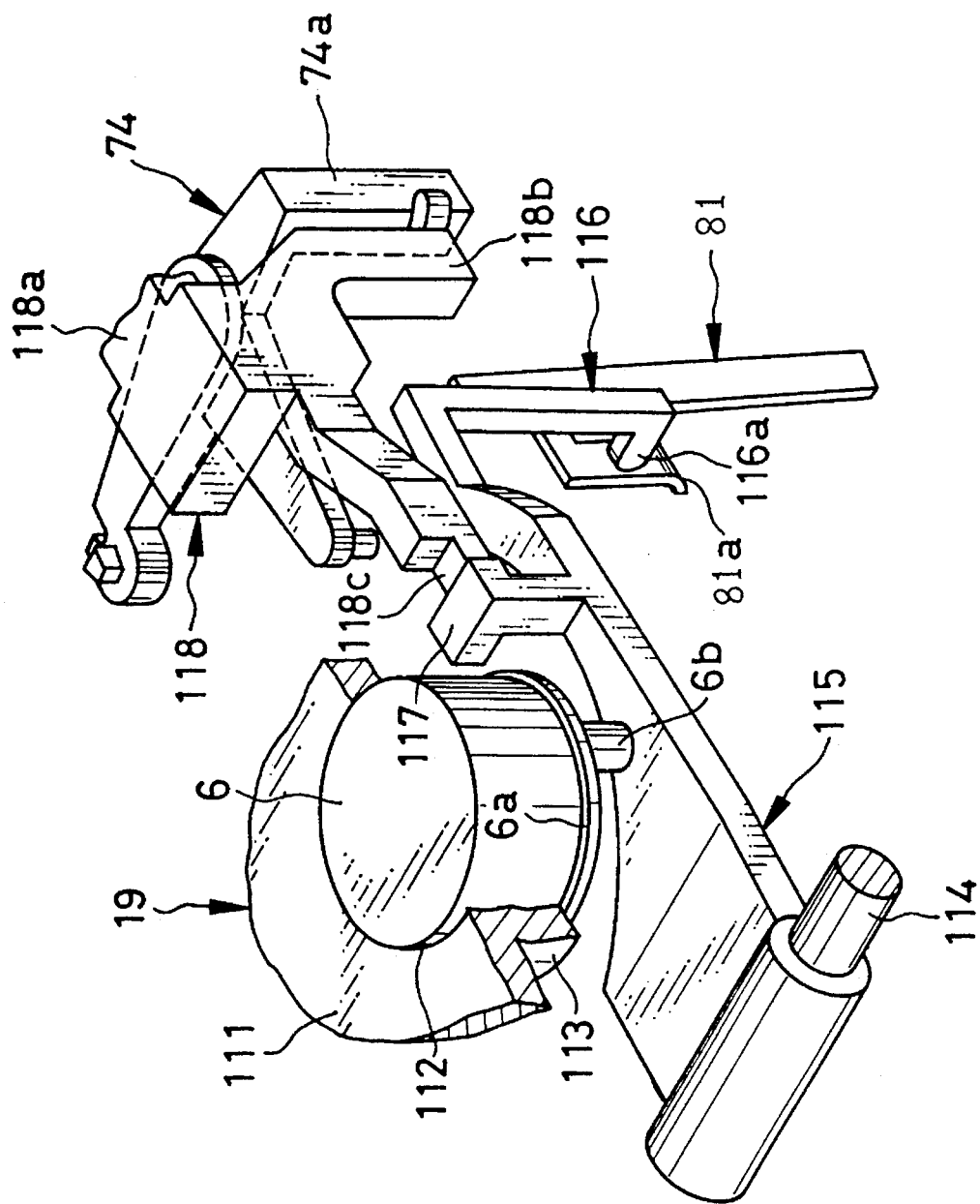
FIG. 8 is a fragmentary perspective view illustrating an interconnection mechanism between a shutter button and other mechanisms.

The shutter button 6 is a cylindrical member, as shown in FIG. 8, which has a flange 6*a* around its bottom rim, and a pressing pin 6*b* protruding downward from its bottom surface. The top wall portion 107 of the front cover 18 has an opening 112 with a sleeve 113 protruding downward from the rim of the opening 112. The shutter button 6 is inserted into the opening 112 from the inside of the front cover 18. Since the flange 6*a* contacts against the bottom of the sleeve 113, the shutter button 6 will not be moved out of the opening 112 in the upward direction.

Figure 9:
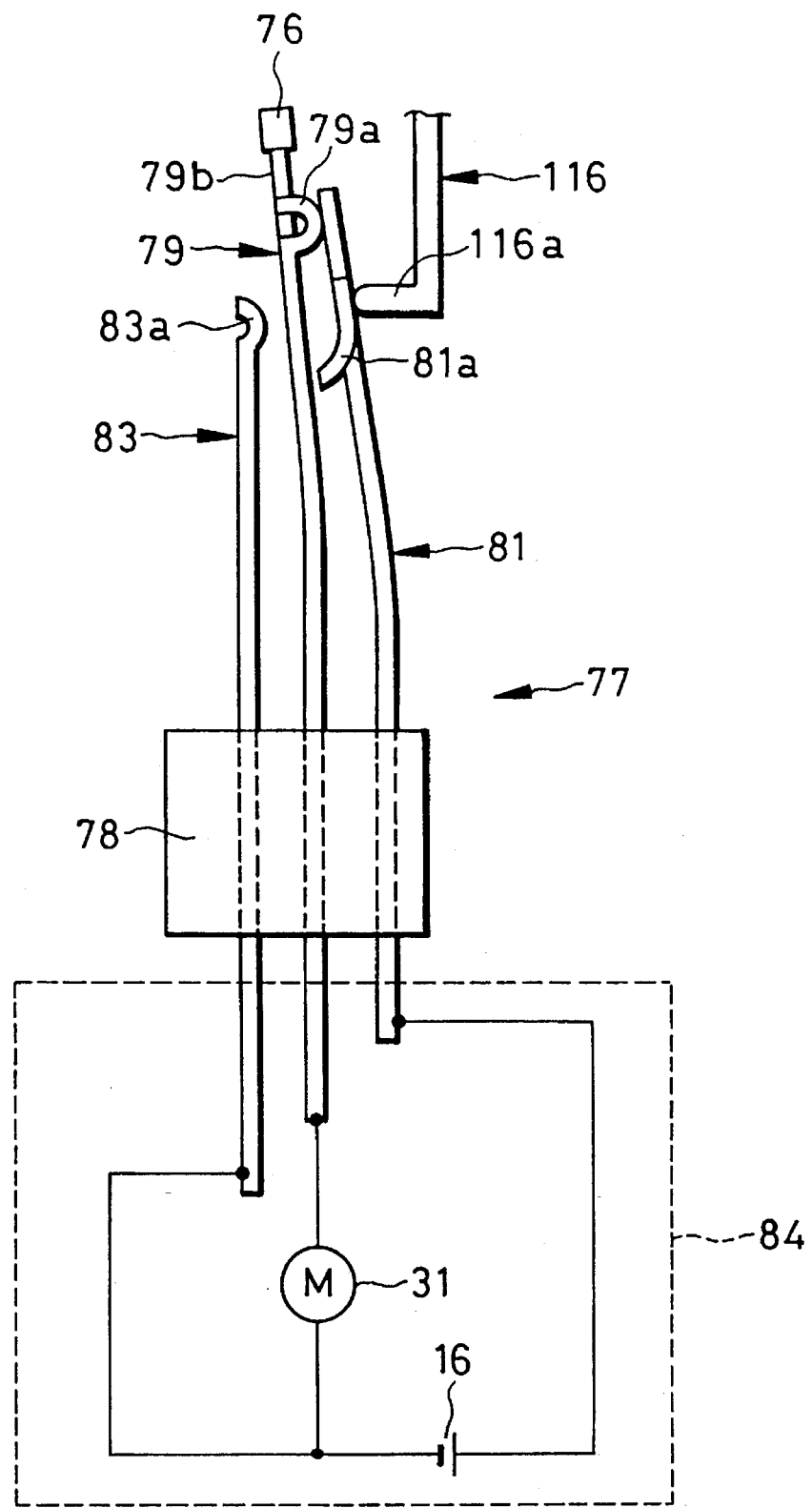
FIG. 9 is an explanatory view of the contact unit in a motor drive position.

On the other hand, the tip of the pressing pin 6*b* contacts an interconnection lever 115. The interconnection lever 115 is pivotally mounted on an axle 114 which is formed on the inside surface of the front cover 18 to extend parallel to the optical axis 22. The interconnection lever 115 is formed integrally with an actuation lever 116 and a connecting projection 117. The actuating lever 116 extends downward from a distal end of the interconnection lever 115, and has a pushing nose 116*a* at its bottom tip. The pushing nose 116*a* protrudes rearwardly of the film unit 2, and may push the J-shaped arm 81*a* of the second contact strip 81 when the shutter button 6 is not depressed, as is shown in FIG. 8. At that time, the second contact strip 81 is bent toward the first contact strip 79, as is shown in FIGS. 6 and 9.

The front cover 18 also has a release lever 118 formed integrally with its top wall portion 107. As the front cover 18 is formed from a resilient plastic material, a resiliency is given to a stem 118*a* of the release lever 118. A connecting arm 118*c* of the release lever 118 is engaged with the connecting projection 117 of the interconnection lever 115 such that the release lever 118 is depressed when the interconnection lever 115 is rotated downward through the pin 6*b* upon depression of the shutter button 6. The release lever 118 has a pushing arm 118*b* which pushes the downward arm 74*a* of the arresting lever 74 when the release lever 118 is depressed, thereby rotating the arresting lever 74 counterclockwise.

The cell 16 is mounted between a pair of contact plates 120 and 121 which are secured to a lower portion of the printed circuit board 15*a* of the flash unit 15, wherein a positive terminal 16*a* of the cell 16 must connect to the contact plate 120, whereas a negative terminal 16*b* must connect to the contact plate 121. Since the contact plates 120 and 121 are connected to the motor unit 17 and the contact unit 77 as well as the flash unit 15, the cell 16 serves as a single DC power source for the electric elements of the film unit 2. Designated by 122 is a charge lamp for indicating that the flash unit 15 is fully charged. The charge lamp 122 is visible through an opening 122*a* formed through the top wall portion 107 of the front cover 18.

The cell 16 may be a dry cell separated from a battery pack which is on the market and contains a plurality of dry cells connected in series or parallel to one another.

Figure 11:
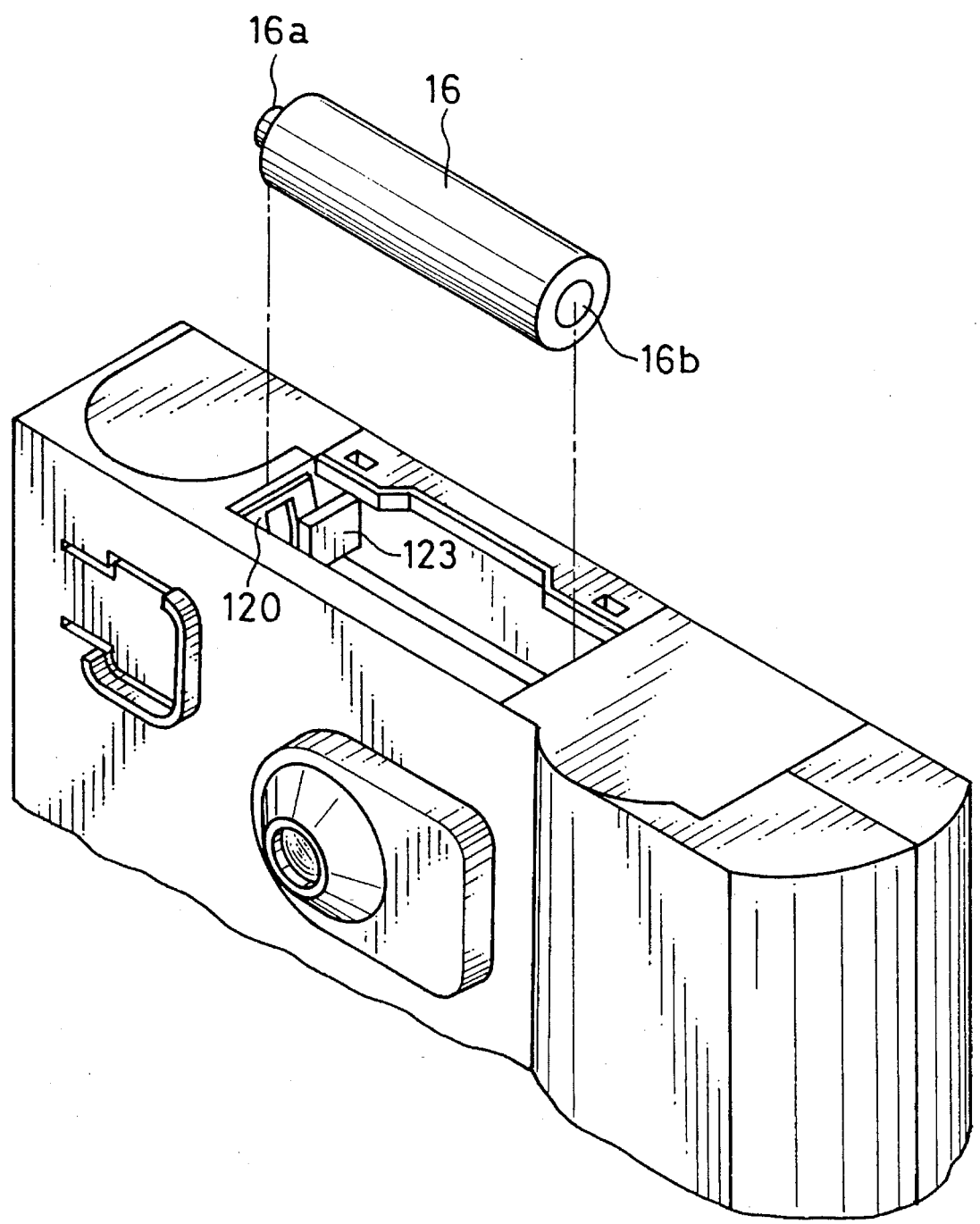
FIG. 11 is a fragmentary perspective view of the unit body from the bottom, illustrating a method for preventing improper loading of a cell.

Since the motor 31 is driven by the DC power source 16, the rotating direction of the motor 31 changes according to the orientation of the cell 16 relative to the contact plates 120 and 121. When the cell 16 is loaded in the proper orientation as shown in FIG. 2, the shaft 31*a* of the motor 31 rotates counterclockwise as shown in FIG. 4. If the cell 16 is reversely loaded, the shaft 31*a* rotates clockwise, so that the photographic film 20*b* will not be wound into the cassette shell 20*a*. To prevent the reversal loading of the cell 16, a projection 123 is formed on the main body 13 such that the projection 123 is placed inside the contact plate 120 in the assembled state, as is shown in FIG. 11. Since the positive terminal 16*a* protrudes outwards, the cell 16 is allowed to be loaded between the contact plates 120 and 121 in spite of the projection 123 if the cell 16 is properly oriented. But if the negative terminal 16*b* is directed to the contact plate 120, it is impossible to load the cell 16. Accordingly, the cell 16 is unfailingly loaded in the proper orientation.

The above-described embodiment operates as follows:

In order to prevent an accidental exposure of the photographic film 20*b* before the film unit 2 is actually put in use, the main switch knob 7 is set in the OFF position and, thereafter, the shutter button 6 is depressed once in the factory prior to packing the film unit 2 in a moisture-proof light-tight bag.

In this position, the operation arm 64 of the operation plate 63 pushes the L-shaped arm 71 of the switching lever 69 to rotate the lever 69 counterclockwise. As a result, the pushing portion 73 of the switching lever 69 pushes the switching member 76 backward. Since the switching member 76 is secured to the tip of the arm 79*b* of the first contact strip 79, the first contact strip 79 is bent backward to contact the contacting portion 83*a* of the third contact strip 83, as is shown in FIG. 6. Therefore, the motor 31 is prevented from being driven.

When using the film unit 2, the photographer removes the film unit 2 from the bag, and slides the main switch knob 7 to the ON position in accordance with the instructions printed on the outer case 4. The instructions may also be printed on the bag. When the main switch knob 7 is slid in the ON position, the operation arm 64 of the operation plate 63 is removed from the switching lever 69, so that the first contact strip 79 resiliently returns to the initial or upright position apart from the third contact strip 83. Since the second contact strip 81 has been bent toward the first contact strip 79 by the pushing nose 116*a* of the actuating lever 116, the contacting portion 79*a* of the first contact strip 79 comes into contact with the second contact strip 81, as is shown in FIG. 9. Then, the motor 31 is driven by being supplied from the cell 16.

When the motor 31 is driven, the shaft 31*a* rotates counterclockwise as shown in FIG. 4. The rotational movement of the shaft 31*a* is transmitted to the winding gear 56 through the gear mechanism 32 while being decelerated at ratios between 100:1 and 280:1. The decelerated rotational movement is transmitted to the winding gear 56 through the lower gear 50*a* of the gear member 50 to rotate the winding gear 56 counterclockwise. Then, the spool 20*d* of the cassette shell 20*a*, being coupled to the winding gear 56 through the teeth 58a of the drive shaft 58, rotates counterclockwise to wind the photographic film 20b into the cassette shell 20a. Because the torque increases as the speed of the rotational movement is reduced, the motor 31 can supply sufficient torque enough to wind up the photographic film 20b even while the motor 31 is supplied with 1.5 V voltage. Therefore, the cell 16 can be a dry cell or the like capable of supplying 1.5 V voltage.

Simultaneously with winding of the photographic film 20b, the sprocket wheel 95, being engaged with the photographic film 20b, rotates counter-clockwise. The cam member 94 rotates together with the sprocket wheel 95, so that the shutter actuating lever 90, being contacted at its one end 90b with the shutter cocking cam 94b, is rotated clockwise toward the cocked position against the force of the spring 92. When the photographic film 20b has been wound by one-frame amount, also the cam member 94 has made one revolution, so that the claw 74b of the arresting lever 74 is trapped in the groove 94e of the winding-stop cam 94a to lock the sprocket wheel 95. The arresting lever 74 slightly rotates clockwise when the claw 74b moves into the groove 94e. As a result, the bottom projection 74c of the arresting lever 74 is engaged with the upper projection 90c of the shutter actuating lever 90 to keep the lever in the cocked position.

Simultaneously with the clockwise rotation of the arresting lever 74, the pin 75 of the lever 74, being engaged in the engaging portion 72 of the switching lever 69, pushes the switching lever 69 to rotate counterclockwise. As a result, the pushing portion 73 of the switching lever 69 pushes the switching member 76 backward, so that the first contact strip 79 is brought into contact with the contacting portion 83a of the third contact strip 83, as is shown in FIG. 6. Thus, the motor 31 is short-circuited and braked as soon as the film unit 2 gets ready for the next exposure.

When the shutter button 6 is depressed in this stage, the interconnection lever 115 is depressed by the pressing pin 6b, to rotate clockwise about the axle 114. As a result, the connecting arm 118c of the release lever 118 is depressed by the connecting projection 117 of the interconnection lever 115, so that the release lever 118 is bent downward about the stem 118a. At that time, the pushing arm 118b pushes the downward arm 74a of the arresting lever 74 to rotate it slightly in the counterclockwise direction.

When the arresting lever 74 is rotated counterclockwise, the downward projection 74c of the arresting lever 74 is disengaged from the upper projection 90c of the shutter actuating lever 90, so that the shutter actuating lever 90 rotates counterclockwise under the force of the spring 92, while striking the shutter blade 96 by the leg 90d. Thereby, the shutter blade 96 is swung to open the shutter aperture 86, and then returns to the closed position under the force of the spring 103. Thus, the photographic film 20b is exposed to light through the taking lens 10. Because the motor 31 stops rotating the moment when the sprocket wheel 95 is locked, as set force above, no biasing force is applied to the photographic film 20b, so that the film 20b is kept immovable during the exposure.

Figure 10:
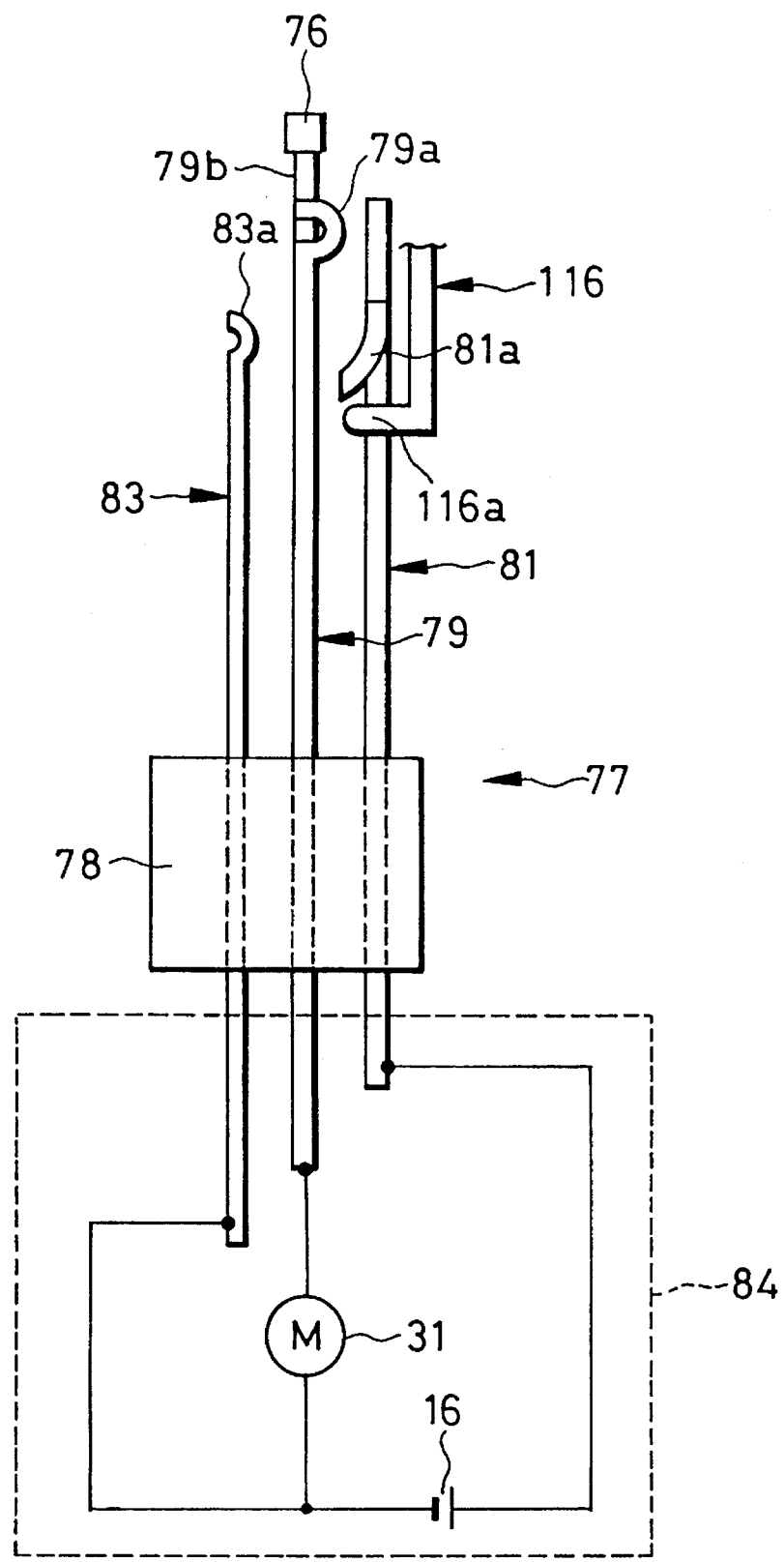
FIG. 10 is an explanatory view of the contact unit in a position when the shutter button is depressed.

With the counterclockwise rotation of the arresting lever 74, the pin 75 quits to push the switching lever 69 in the counterclockwise direction. Then, the first contact strip 79 resiliently returns to the initial upright position. However, so long as the shutter button 6 is depressed, the pushing nose 116a of the actuating lever 116 is disposed below the J-shaped arm 81a of the second contact strip 81, so that the second contact strip 81 resiliently returns to an initial upright position as shown in FIG. 10, wherein the first and second contact strips 79 and 81 are separated from each other. Accordingly, the motor 31 will not be driven so long as the shutter button 6 is depressed.

When the photographer stops depressing the shutter button 6, the interconnecting lever 115 is moved upward because of the resiliency of the release lever 118, so that the actuating lever 116 moves up to push the second contact strip 81 to contact the first contact strip 79. Then, the motor 31 is driven to wind up the photographic film 20b, so that the shutter actuating lever 90 is cocked, and then, the sprocket wheel 95 is locked when the photographic film 20b has been wound up by one frame, in the same way as set forth above. Thanks to the J-shaped curve of the arm 81a of the second contact strip 81, the pushing nose 116a of the actuating lever 116 may smoothly contact and push the arm 81a.

According to the above embodiment, because the motor 31 is controlled ON and OFF through a single contacting point of the contact unit 77, voltage drop caused by contact resistance is minimized. In addition, the speed-reduction gear mechanism 32 transmits the rotational movement of the motor 31 to the spool 20d while increasing the torque, so that the motor 31 can rotate stably with a single 1.5 V cell to supply the spool 20d with sufficient torque enough to wind up the photographic film 20b.

Figure 12:
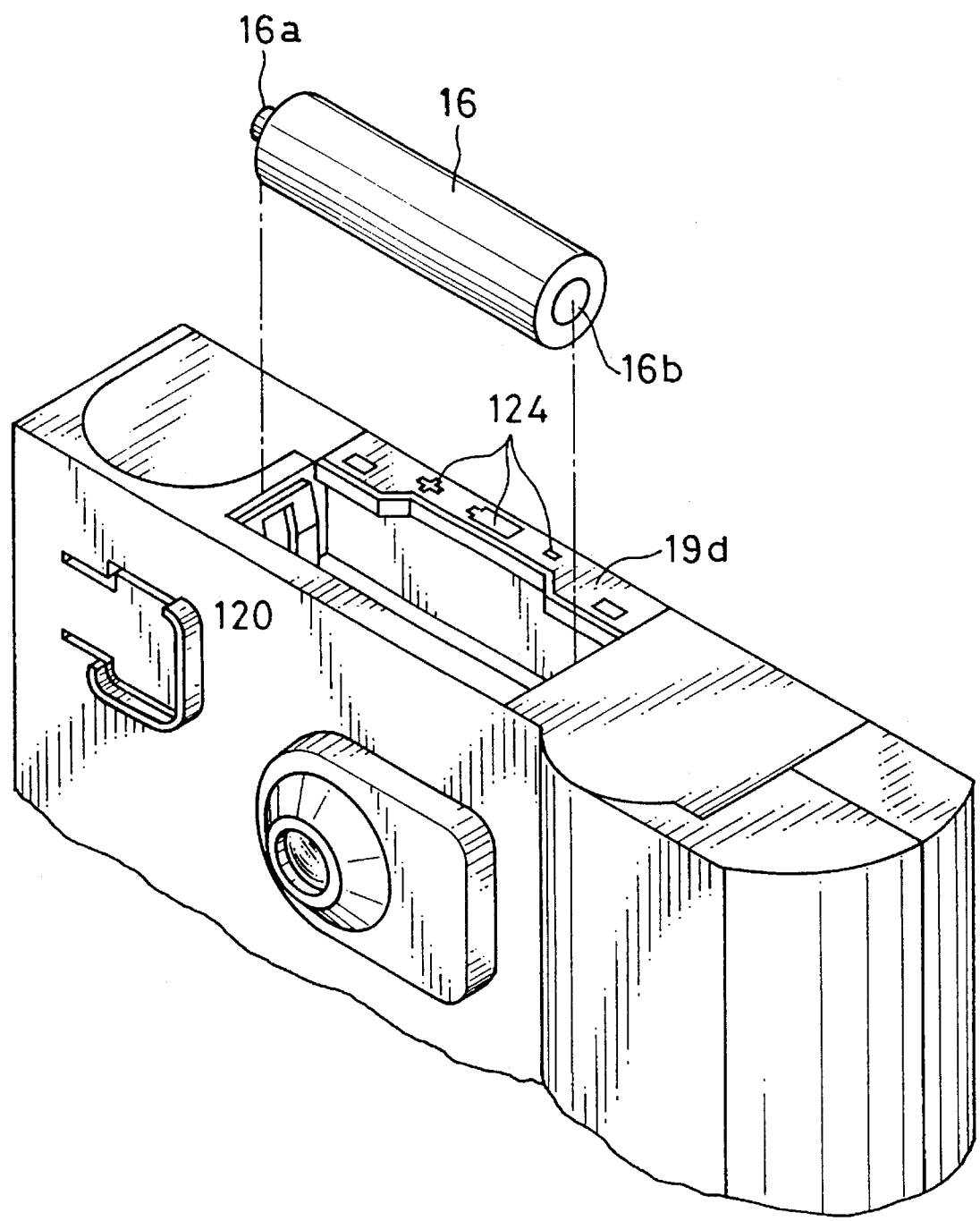
FIG. 12 is a view similar to FIG. 11, but illustrating another method for preventing improper loading of the cell.

In order to prevent improper loading of the cell 16, it may be effective to provide symbolic indicia 124 on the bottom wall 19d of the rear wall 19, as is shown in FIG. 12, for indicating the proper positive/negative orientation of the cell 16, instead of providing the projection 123.

FIGS. 13 to 20B show another preferred embodiment of the present invention, wherein like or equivalent elements are designated by the same reference numerals as in the embodiment shown in FIGS. 1 to 12, so that the following description exclusively relates to those parts which are essential to the embodiment shown in FIGS. 13 to 20B.

In this embodiment, a main switch knob 7 is disposed in a lower front position of a film unit 2 between a taking lens 10 and a flash charge switch 11, so as to be slidable right and left.

Figure 14:
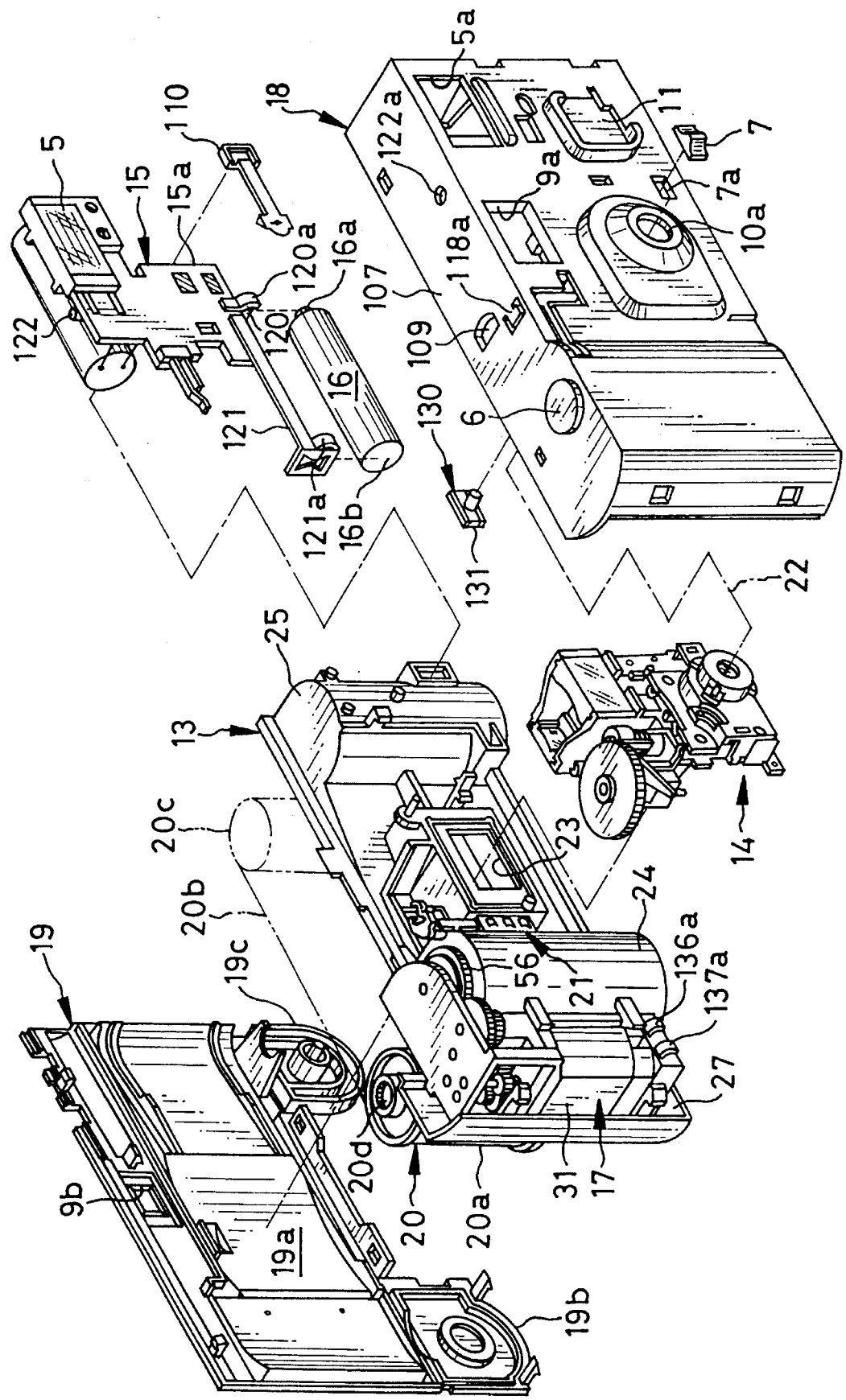
FIG. 14 is an exploded perspective view of a unit body of the film unit shown in FIG. 13.
Figure 15A:
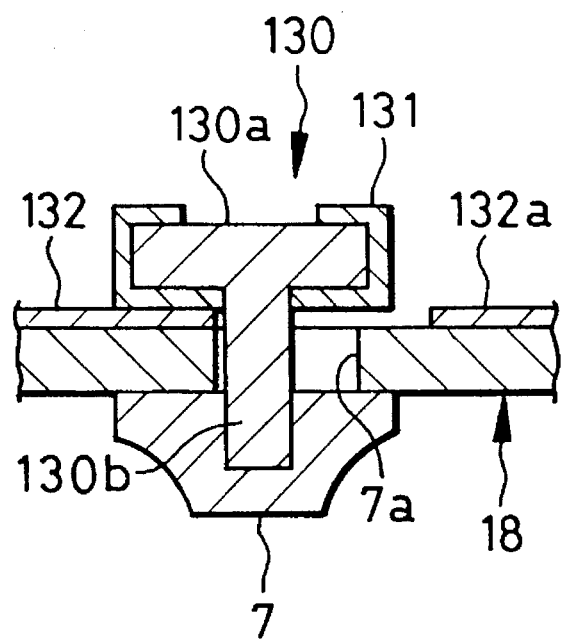
FIGS. 15A and 15B are fragmentary sectional views illustrating a main switch of the film unit shown in FIG. 13.

As shown in FIG. 14, the main switch knob 7 is secured to a switching plate 130 through an opening 7a formed through a front cover 18 of the film unit 2. As shown in FIG. 15A, the switching plate 130 has a base portion 130a and a pin 130b protruding forwardly of the base portion 130a, which are integrally formed from a resin material. The switching plate 130 further has a metal strip 131 overlaid on the base portion 130a surrounding the pin 130b. The knob 7 is fitted on the pin 130b through the opening 7a so as to permit sliding the switching plate 130 on the inner surface of the front cover 18 along with the knob 7.

Figure 13:
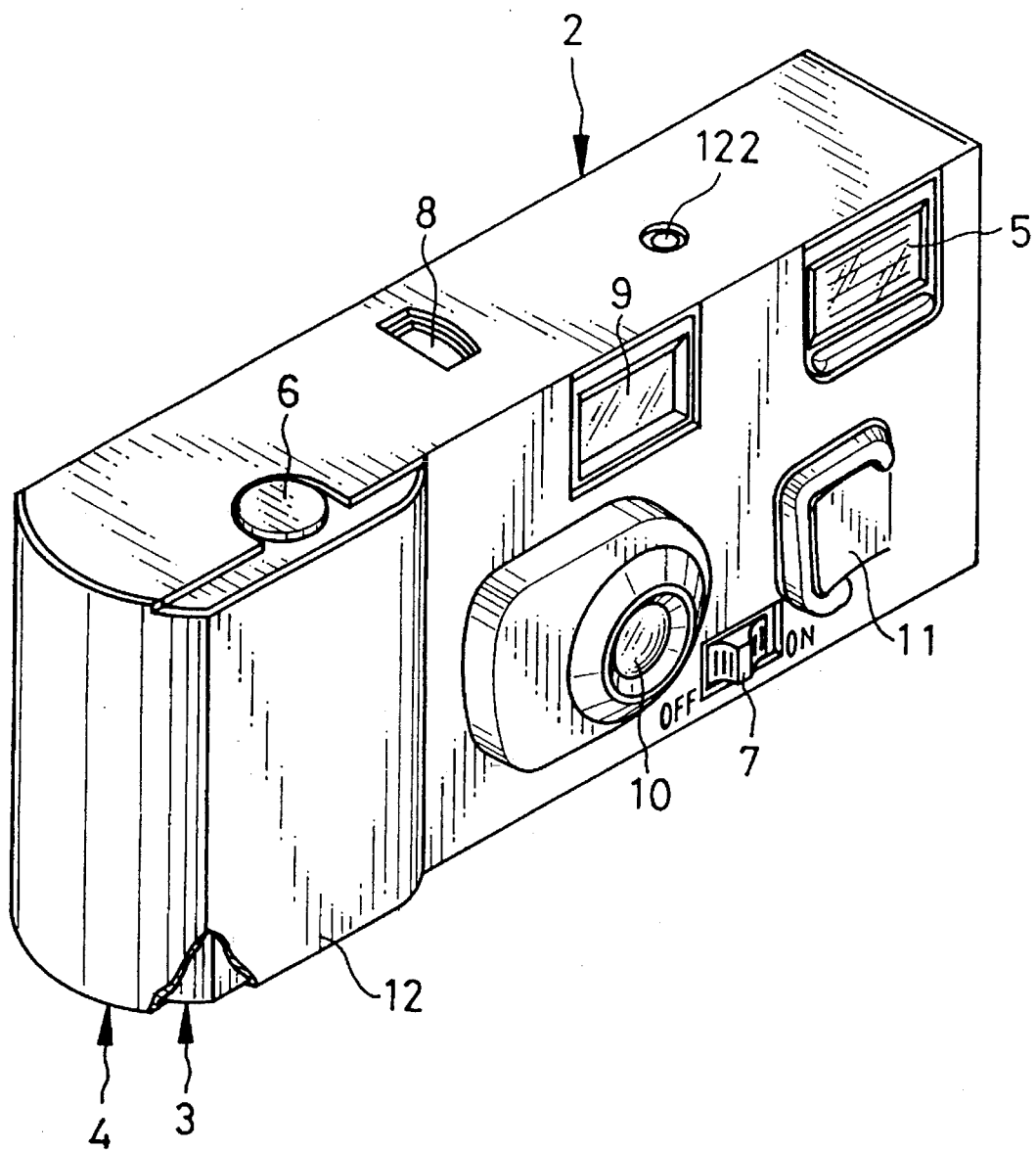
FIG. 13 is a perspective view of a film unit according to another preferred embodiment of the invention.
Figure 15B:
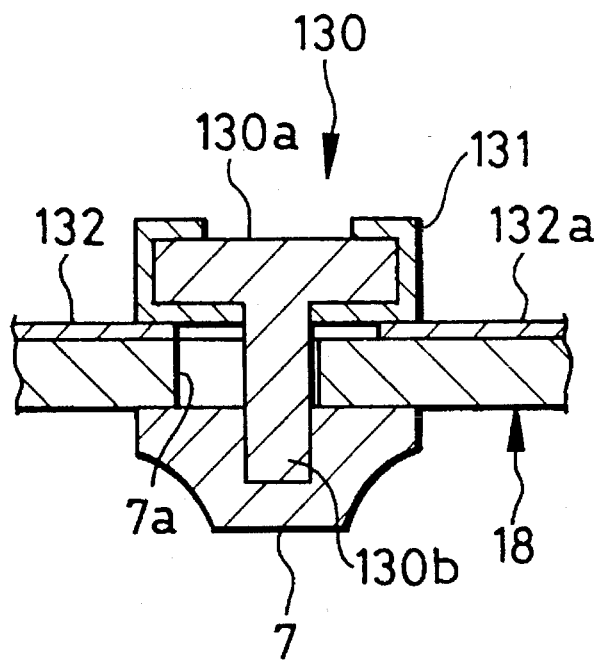
Figure 16:
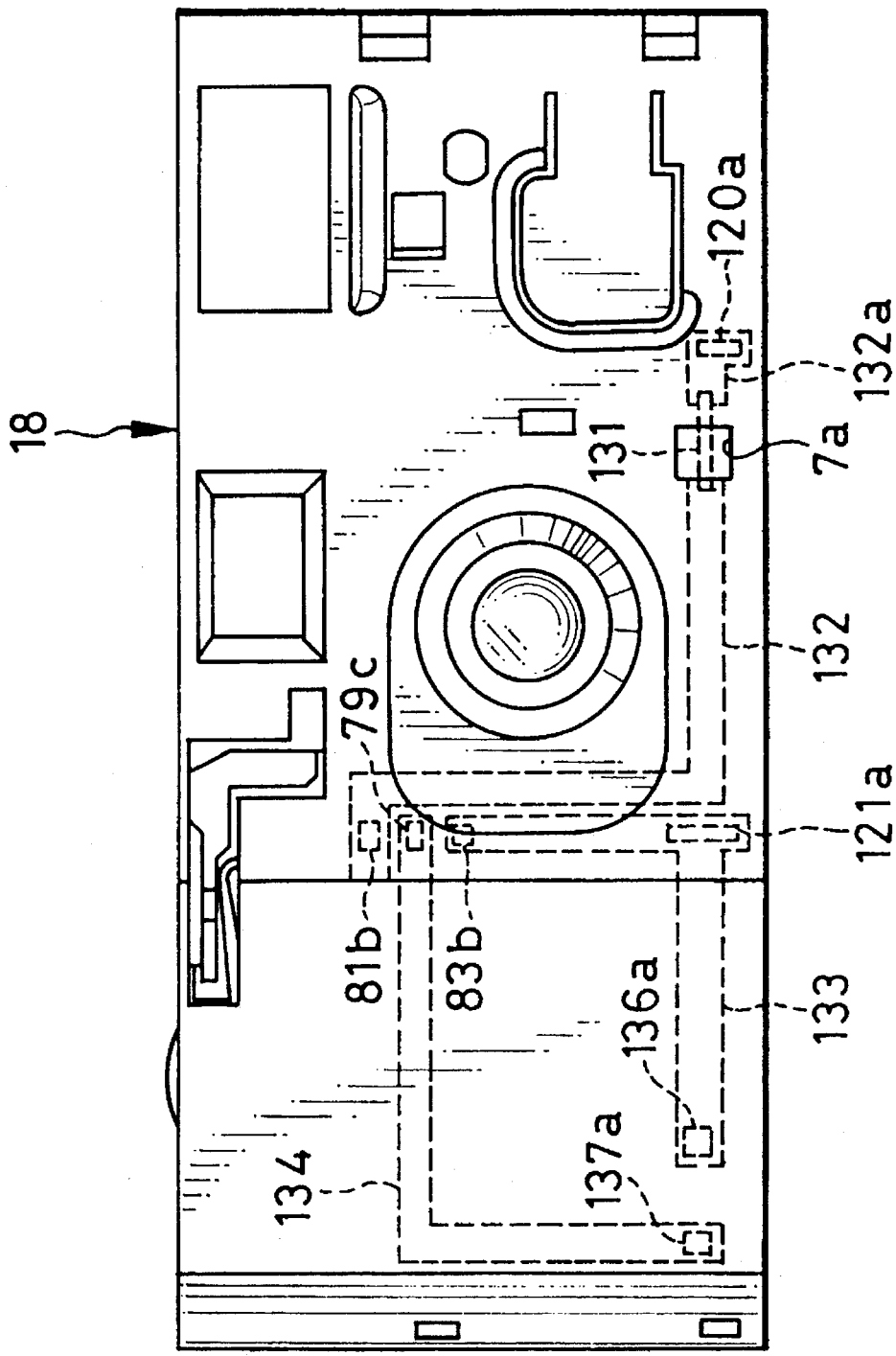
FIG. 16 is an explanatory view illustrating the arrangement of conductive layers provided on the inner surface of the front cover of the film unit shown in FIG. 13.

As shown by dashed lines in FIG. 16, conductive layers 132 and 132a are provided in the left and right sides of the opening 7a on the inner surface of the front cover 18. The conductive layers 132 and 132a may be made by sticking sheet iron strips onto the inner surface of the front cover 18. When the knob 7 is moved in an OFF position as shown in FIG. 13, wherein the pin 130b is stopped by a left margin of the opening 7a, as is shown in FIG. 15A, the metal strip 131 of the switching plate 130 is in contact with one end of the conductive layer 132 but is spaced apart from the conductive layer 132a. When the knob 7 is moved in an ON position, i.e. the right end position, wherein the pin 130b is stopped by a right margin of the opening 7a, as is shown in FIG. 15B, the metal strip 131 comes into contact with both conductive layers 132 and 132a to connect these conductive layers 132 and 132a to each other.

Also, conductive layers 133 and 134 are provided by putting or sticking sheet iron strips onto the inner surface of the front cover 18, as is shown by dashed lines in FIG. 16. These layers 132, 132a, 133 and 134 are arranged such that, when the film unit 2 is completely assembled, a motor 31 of a motor unit 17 and three contact strips 79, 81 and 83 of a contact unit 77 are connected to each other and to a cell 16 through these layers 132 to 134 to provide a film winding circuit 84 as shown in FIG. 17.

The cell 16 is loaded to contact with contact plates 120 and 121 which are mounted to a flash unit 15. The contact plate 120 for a positive terminal 16a of the cell 16 has a contacting portion 120a which is curved forwardly convex so as to have a certain resiliency. Also the contact plate 121 for a negative terminal 16b of the cell 16 has a forwardly convex contacting portion 121a. When the front cover 18 is attached to a main body 13 to cover the front of the flash unit 15, the conductive layer 132a is pressed against the contacting portion 120a, and the conductive layer 133 is pressed at its intermediate portion against the contacting portion 121a, as is shown in FIG. 16.

Figure 17:
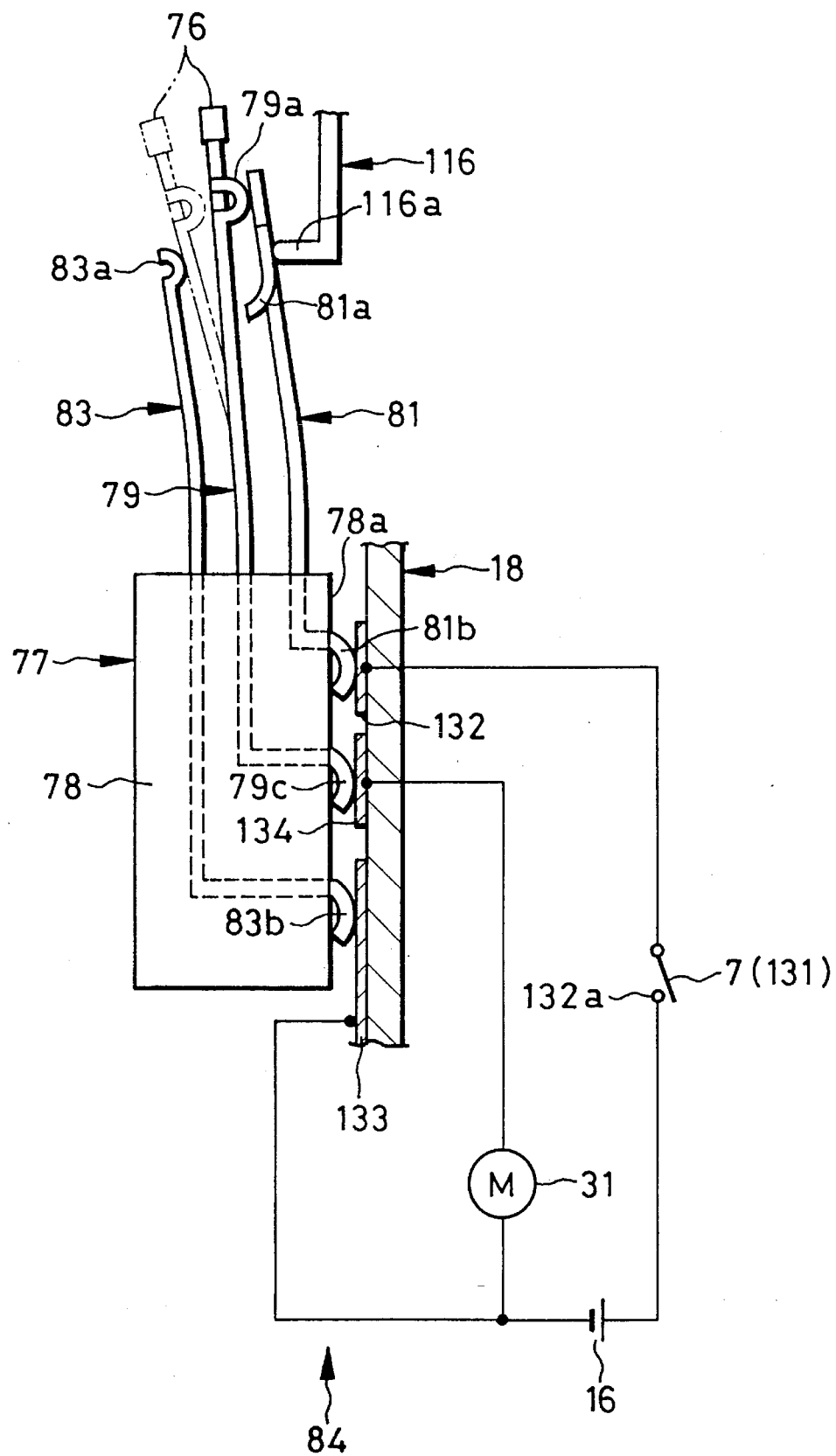
FIG. 17 is an explanatory of a contact unit and a film winding circuit according to the embodiment shown in FIG. 13.
Figure 18:
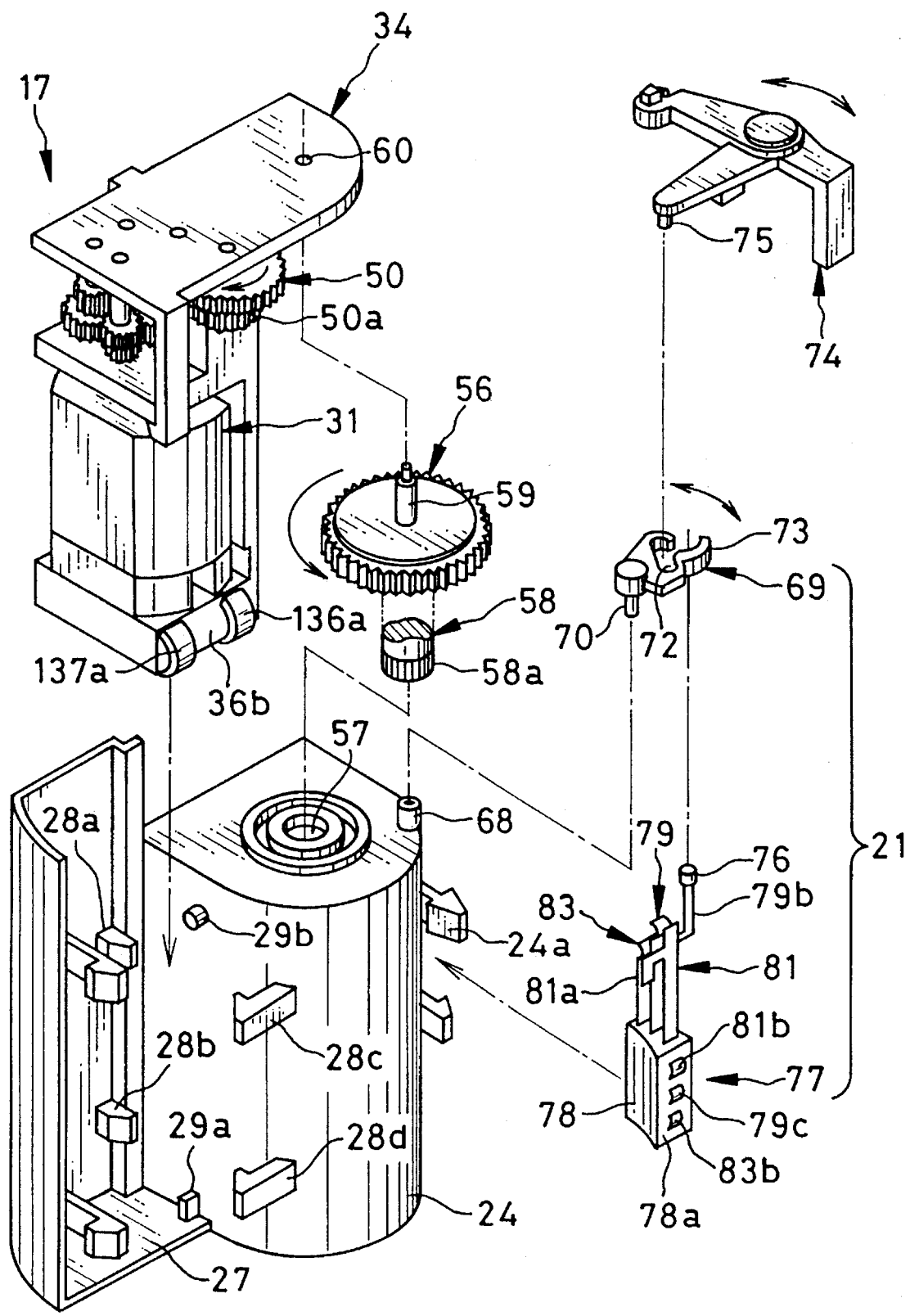
FIG. 18 is an exploded fragmentary perspective view of a film winding mechanism of the film unit shown in FIG. 13.

On the other hand, as shown in FIGS. 17 and 18, lower ends 79c, 81b and 83b of the first to third contact strips 79, 81 and 83 are exposed to a front side 78a of the contact unit 77 through a holding portion 78, and are curved forwardly convex to form resilient contacting portions, respectively. In the assembled film unit 2, the opposite end of the conductive layer 132 from the opening 7a is pressed against the contacting portion 81b of the second contact strip 81. Also, the conductive layer 133 is pressed at its one end against the contacting portion 83b of the third contact strip 83, whereas the conductive layer 134 is pressed at its one end against the contacting portion 79c of the first contact strip 79c.

The opposite ends of the conductive layers 133 and 134 are connected to the motor 31 through a pair of connection plates 136 and 137 which are mounted to a lower supporting portion 36 of a motor frame 33 of the motor unit 17. The connection plates 136 and 137 have contacting portions 136a and 137a in their one ends which are exposed to a front side 36b of the lower supporting portion 36. The contacting portions 136a and 137a are also curved forwardly convex to have a certain resiliency so that the opposite ends of the conductive layers 133 and 134 are pressed against the contacting portions 136a and 137a when the front cover 18 is assembled.

Figure 19:
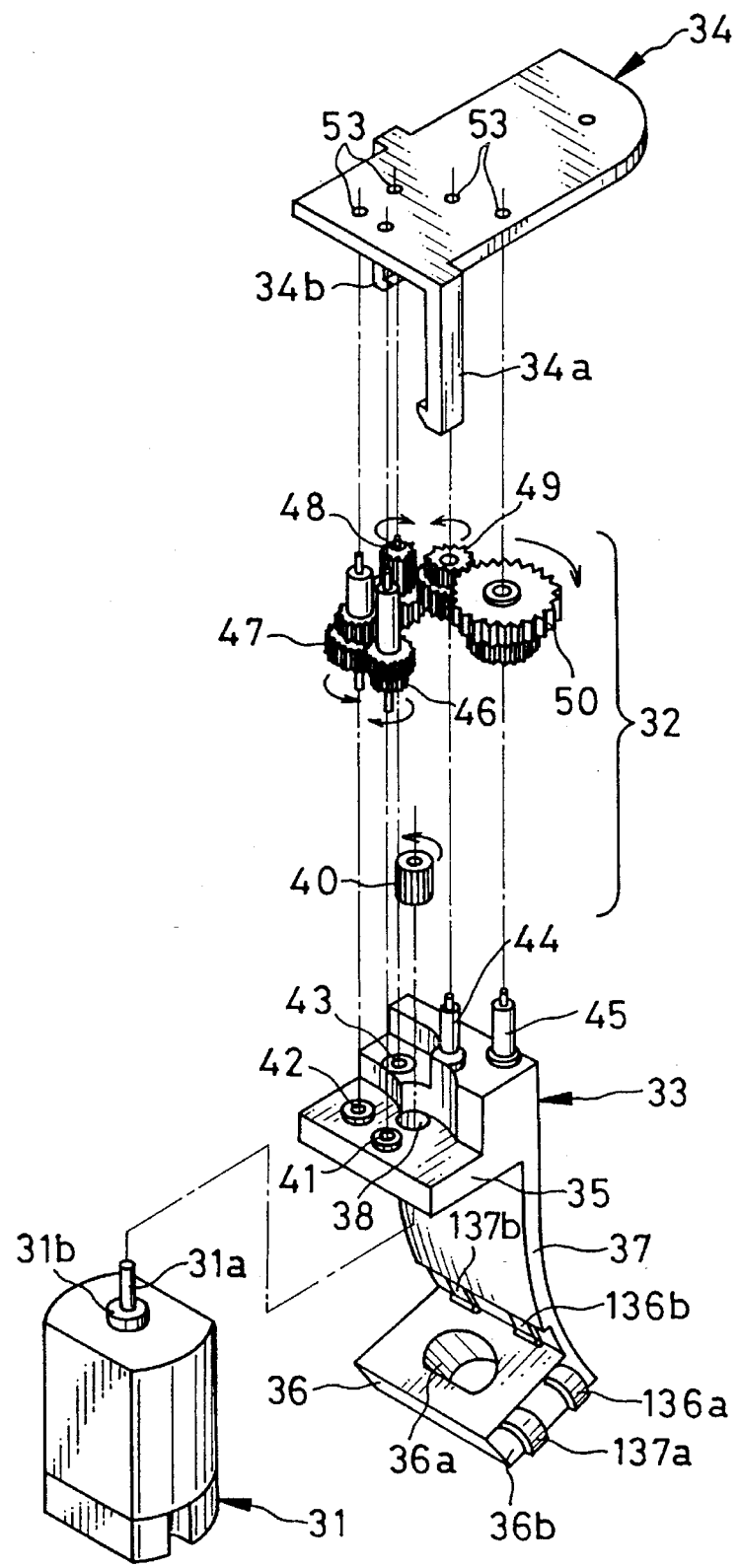
FIG. 19 is an exploded perspective view of the motor unit shown in FIG. 18.
Figure 20:
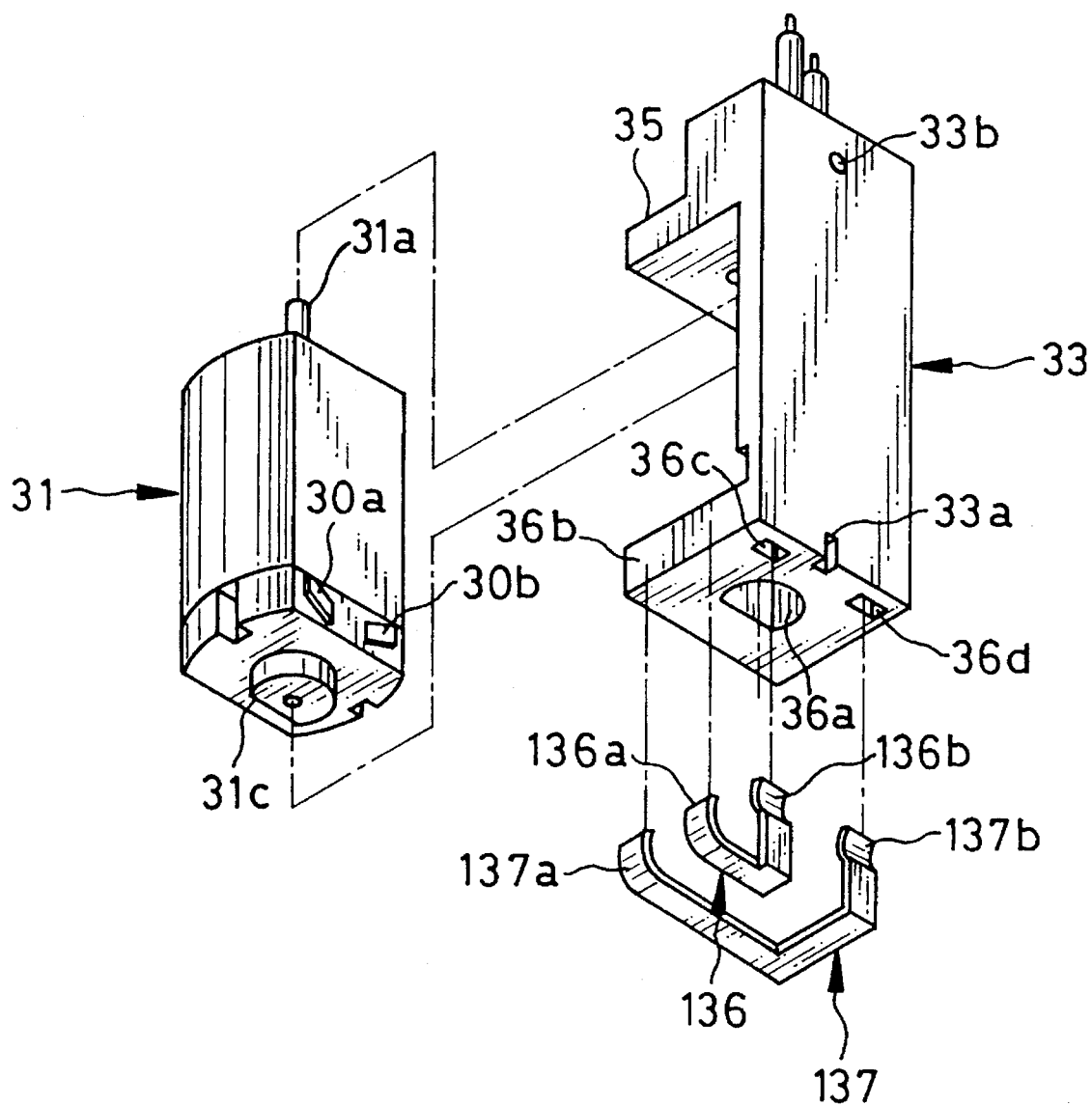
FIG. 20 is an explanatory view illustrating a connection method of the motor.

The opposite end portions 136b and 137b of the connection plates 136 and 137 from the contacting portions 136a and 137a are disposed inside a lower corner of a connecting portion 37 of the motor frame 33, as shown in FIG. 19, so as to be brought into contact with electrode plates 30a and 30b of the motor 31, which are exposed to the outside of the motor 31, as is shown in FIG. 20. The end portions 136b and 137b of the connection plates 136 and 137 are also curved inwardly convex in the motor frame 33 to facilitate secure contact with the electrode plates 30a and 30b.

Consequently, the conductive layer 134 connects the first contact strip 79 to the motor 31 through the contacting portions 79c and 137a. The conductive layer 133 connects the motor 31, the negative terminal 16b of the cell 16 and the third contact strip 83 to one another through the contacting portions 136a, 121a and 83b, respectively. Since the second contact strip 81 is connected to the conductive layer 132 through the contacting portion 81b, and the positive terminal 16a of the cell 16 is connected to the conductive layer 132a through the contacting portion 120a, the second contact strip 81 is connected to the positive terminal 16a when the main switch knob 7 is set in the ON position and connects these layers 132 and 132a through the metal strip 131, as is shown in FIGS. 15B and 16.

In this way, the film winding circuit 84 as shown in FIG. 17 is provided without the need for wiring and soldering a lot of lead wires. By virtue of the curved contacting portions, not only the conductive layers 132, 132a, 133 and 134 are pressed against the contacting portions to ensure electric connection, but also contact resistance between the contacting portions and the conductive layers is minimized. Therefore, electric power is efficiently supplied from the cell 16, and voltage drop is still more reduced at the contact between the contact strips 79 and 81 or 79 and 83.

According to the film winding circuit 84, so long as the main switch knob 7 is set in the ON position, the motor 31 is driven when an upper contacting portion 79a of the first contact strip 79 is brought into contact with the second contact strip 81. The motor 31 is stopped from rotating when the first contact strip 79 is brought into contact with an upper contacting portion 83a of the third contact strip 83. While the main switch knob 7 is in the OFF position, the motor 31 will not be driven even when the first contact strip 79 contacts the second contact strip 81.

When manufacturing the film unit 2, the main body 13 formed from a plastic resin material is conveyed on an assembling line, while a winding gear 56, a picture-taking unit 14, the flash unit 15, the motor unit 17 and a motor drive switch 21 including the contact unit 77 and a switching lever 69 are mounted to the main body 13 in a predetermined sequence. These units 14, 15 and 17 are previously assembled in respective assembling processes.

When assembling the motor unit 17, the connection plates 136 and 137 are mounted to the lower supporting portion 36 by inserting the end portions 136b and 137b from the bottom into openings 36c and 36d formed through the lower supporting portion 36. Thereafter, the motor 31 is mounted in the motor frame 33, in the same way as in the first embodiment. That is, a shaft 31a of the motor 31 is inserted through a hole 38 of an upper supporting portion 35 of the motor frame 33 while resiliently bending the connecting portion 37. Thereafter, an opening 36a formed through a lower supporting portion 36 is fitted on a bottom projection 31c of the motor 31 while returning the connection wall 37 to the initial upright position. Thus, the motor 31 is clamped between the supporting portions 35 and 36, to be secured in the axial direction. Because the opening 36a and the bottom projection 31c have an identical non-circular shape, the motor 31 is securely positioned also in the rotational direction.

After the motor 31 is mounted in this way, a gear mechanism 32 and a top plate 34 are mounted to the upper supporting portion 35 in the same way as in the first embodiment, to complete the motor unit 17. However, no ridge nor operation plate is provided on the top plate 34 in the present embodiment. On the other hand, as shown in FIG. 18, the winding gear 56 is mounted atop the cassette chamber 24 through a hole 57, and the contact unit 77 is secured to a front portion of the cassette chamber 24 through a hook 24a. Then, a pivot 70 of the switching lever 69 is fitted in a bearing sleeve 68 such that a pushing portion 73 thereof is in contact with a front portion of a switching member 76 of the contact unit 77. Thus, the switching lever 69 and the contact unit 77 constitute the motor drive switch 21. The switching lever 69 does not have such an L-shaped arm in the present embodiment, that is designated by 71 in the first embodiment.

Then, the motor unit 17 is mounted in a motor unit chamber 27 of the main body 13, and is secured thereto through hooks 28*a* to 28*d*. At that time, the motor unit 17 can be easy to position in the motor unit chamber 27 by virtue of a cut-out 33*a* and a hole 33*b*, which are formed in the motor frame 33 on the opposite side from the motor 31 so as to be fitted on projections 29*a* and 29*b* in the proper mounting position, which are formed on the outer wall of a cassette chamber 24 between the hooks 28*a*, 28*b* and 28*c*, 28*d*. In the proper mounting position, the electrode plates 30*a* and 30*b* of the motor 31 are pressed against the end portions 136*b* and 137*b* of the connection plates 136 and 137. Although the cut-out 33*a* and the hole 33*b* are not shown in the first embodiment, the motor frame 33 of the first embodiment also has like cut-out and hole which are fitted on projections 29*a* and 29*b* as shown in FIG. 3, to permit easy positioning of the motor unit 17.

After the motor unit 17, the flash unit 15, the picture-taking unit 14 and other mechanisms are mounted to the main body 13 as shown in FIG. 14, the front cover 18 is attached to the front of the main body 13. Thereby, the conductive layers 132, 132*a*, 133 and 134 provided on the inner surface of the front cover 18 are pressed against the contacting portions 81*b*, 120*a*, 136*a*, 83*b*, 121*a*, 137*a* and 79*c* in the above-described combinations.

Thereafter, a photographic film cassette 20 is loaded from the rear side in the main body 13 in a dark, such that unexposed photographic film 20*b* withdrawn from a cassette shell 20*a* and wound in a roll 20*c* is placed in a film roll chamber 25, while the empty cassette shell 20*a* is placed in a cassette chamber 24. A rear cover 19 is attached to the rear side of the main body 13 to contain the photographic film cassette 20 in light-tight fashion. Then, the cell 16 is loaded to complete a unit body 3 containing the photographic film cassette 20. The unit body 3 is encased in an outer case 4, after passing a series of inspection tests.

In order to prevent an accidental exposure, the main switch knob 7 is set in the OFF position in factory, and a shutter button 6 is once depressed before the film unit 2 is packed in a light-tight moisture-proof bag. The shutter button 6 may be interconnected to an arresting lever 74 of the picture-taking unit 14 through those levers which are shown in FIG. 8. In this condition, the metal strip 131 of the switching plate 130 is in contact with the conductive layer 132 only, as is shown in FIG. 15A, so that the motor 31 is disconnected from the cell 16 and will not be driven even if the shutter button 6 is depressed.

After purchasing the film unit 2, the photographer sets the main switch knob 7 in the ON position in accordance with instructions printed on the film unit 2. Then, the metal plate 131 contacts both of the conductive layers 132 and 132*a* to connect one terminal of the motor 31 to the cell 16. Since the shutter button 6 has been depressed once in the factory, a pin 75 of the arresting lever 74 does not push the switching lever 69 in the counterclockwise direction, so that the switching member 76 is not pushed by the pushing portion 73, and the first contact strip 79 is in the initial upright position, as shown by solid lines in FIG. 17. On the other hand, the second contact strip 81 is pushed by a pushing nose 116*a* of an actuating lever 116. Therefore, the first contact strip 79 contacts the second contact strip 81, and the motor 31 starts being driven. Thereafter, each time the photographic film 20*b* has been wound by one frame amount, the arresting lever 74 pushes the switching lever 69 through the pin 75 in the counterclockwise direction to switch over the first contact strip 79 from the second contact strip 81 to the third contact strip 83, as is shown by phantom lines in FIG. 17, to short-circuit and brake the motor 31, in the same way as in the first embodiment.

Since the photographic film 20*b* is adapted to be entirely wound into the cassette shell 20*a* after the last available frame is exposed, the motor 31 keeps rotating. Thus alerted, the photographer recognizes the completion of exposure of the photographic film 20*b*, and slides the main switch knob 7 to the OFF position in accordance with the printed instruction. The film unit 2 is then forwarded to a photofinisher for development and printing. The photofinisher tears the outer case 4 and opens a bottom lid 19*b* to remove the exposed photographic film cassette 20.

Thus emptied film unit 2 is collected by a manufacturer for recycling. The film unit 2 is conveyed on a disassembling line, while the outer case 4 is removed from the unit body 3, and the front cover 18, the flash unit 15, the picture-taking unit 14 and the motor unit 17 are sequentially detached from the main body 13. Having no lead or the like for wiring, the motor unit 17 can be easily detached by bending the hooks 28*c* and 28*d*.

The picture-taking unit 14, the flash unit 15 and the motor unit 17 are subjected to respective inspection processes. As for the motor unit 17, malfunction of the motor 31 and the gear mechanism 32 is inspected. If the motor 31 is defective, the motor 31 is replaced by a good motor with ease while bending the connecting portion 37 of the motor frame 33. If the gear mechanism 32 is in bad condition, the top plate 34 is separated from the motor frame 33 to replace the gear mechanism 32.

After passing the inspections, the picture-taking unit 14, the flash unit 15 and the motor unit 17 are transported to an assembling line, wherein the same process as set forth above is performed to complete a film unit 2, without the need for wiring and soldering.

Although the conductive layers 132, 132*a*, 133 and 134 are made by putting sheet iron strips onto the inner surface of the front cover 18 in the above embodiment, it is possible to form the conductive layers by conductive coating or the like.

While the contacting portions are curved convex to get a certain resiliency and minimize the contacting area in the above embodiment, the contacting portions may have another shape, e.g., a V-shape, a J-shape, or the like. It is also possible to combine the above-described embodiments with each other. The operation plate 63 may slide in a direction perpendicular to the optical axis 22 or may swing to actuate the switching lever 69. The main switch constituted of the switching plate 130 and the knob 7 may be disposed on the course of the other conductive layer between the motor 31 and the cell 16.

Although the present invention has been described with reference to preferred embodiments shown in the drawings, the present invention is not limited to the embodiments but, on the contrary, various modifications of the present invention may be possible without departing from the scope and spirit of the appended claims.

What is claimed is:

1. In a lens-fitted photographic film unit preloaded with photographic film and having a simple picture-taking mechanism including a taking lens, a shutter blade, a shutter button movable between a rest position and a depressed position while being biased toward said rest position, a shutter actuating lever for actuating said shutter blade to expose a frame on said photographic film upon depression of said shutter button, and an arresting lever which rotates in a first direction to release said shutter actuating lever from a cocked position upon depression of said shutter button, and rotates in a second direction to arrest said shutter actuating lever in the cocked position when said exposed frame of said photographic film has been wound into a container by rotating a spool of said container, the improvement comprising:

a winding gear coupled to said spool to permit rotating said spool;

a motor for driving said winding gear;

a speed-reduction gear mechanism for transmitting driving power from said motor to said winding gear while reducing the rotational speed of said motor and increasing torque supplied to said winding gear;

a single cell for supplying said motor; and a motor drive switch connected between said motor and said cell, said motor drive switch being switched over by said arresting lever to drive or stop said motor in synchronism with said picture-taking mechanism.

2. A lens-fitted photographic film unit as recited in claim 1, wherein said reduction gear mechanism comprises a plurality of spur gears and reduces the rotational speed of said motor at ratios between 100:1 and 280:1.

3. In a lens-fitted photographic film unit preloaded with photographic film and having a simple picture-taking mechanism including a taking lens, a shutter blade, a shutter button movable between a rest position and a depressed position while being biased toward said rest position, a shutter actuating lever for actuating said shutter blade to expose a frame on said photographic film upon depression of said shutter button, and an arresting lever which rotates in a first direction to release said shutter actuating lever from a cocked position upon depression of said shutter button, and rotates in a second direction to arrest said shutter actuating lever in the cocked position when said exposed frame of said photographic film has been wound into a container by rotating a spool of said container, the improvement comprising:

a winding gear coupled to said spool to permit rotating said spool;

a motor for driving said winding gear;

a speed-reduction gear mechanism for transmitting driving power from said motor to said winding gear while reducing the rotational speed of said motor and increasing torque supplied to said winding gear;

a single cell for supplying said motor; and a motor drive switch connected between said motor and said cell, said motor drive switch being switched over by said arresting lever to drive or stop said motor in synchronism with said picture-taking mechanism, wherein said motor drive switch comprises:

a switching lever rotatable in conjunction with said arresting lever;

a first resilient contact strip actuated by said switching lever; and second and third resilient contact strips disposed on opposite sides of said first contact strip and isolated from one another, said first contact strip being bent by said switching lever into contact with said third contact strip when said arresting lever rotates in said second direction, and resiliently returning to an initial position when said arresting lever rotates in said first direction upon depression of said shutter button, said second contact strip being bent toward said first contact strip while said shutter button is in said rest position, so as to come into contact with said first contact strip when said first contact strip returns to said initial position, wherein said motor is driven to wind up said photographic film when said first and second contact strips come into contact with each other, and is short-circuited to be braked when said first and third contact strips come into contact with each other.

4. A lens-fitted photographic film unit as recited in claim 3, further comprising an externally operable switch member for disconnecting said cell from said motor in an OFF position.

5. A lens-fitted photographic film unit as recited in claim 4, wherein said externally operable switch member actuates said switching lever to bend said first contact strip toward said third contact strip to keep said first contact strip apart from said second contact strip in said OFF position.

6. In a lens-fitted photographic film unit comprising a main body containing a film container with a spool and a roll of photographic film with one end secured to said spool, and having a picture-taking mechanism mounted thereto; and a front cover removably attached to the front of said main body; the improvement comprising:

a motor unit removably attachable to a front portion of said main body, said motor unit comprising a motor for rotating said spool to wind up said photographic film into said film container one frame after each exposure, and having a pair of contacting portions connected to said motor and protruding forwardly of said motor unit;

a pair of contact plates mounted to a front portion of said main body for holding a cell therebetween, said contact plates respectively having contacting portions which protrude forwardly of said main body; and a plurality of conductive layers formed on an inner surface of said front cover so as to be in contact with said contacting portions when said front cover is attached to said main body, to provide a film winding circuit for supplying said motor with said cell.

7. A lens-fitted photographic film unit as recited in claim 6, wherein said film winding circuit further includes a motor drive switch for connecting said motor to said cell after each exposure and disconnecting said motor from said cell when said photographic film has been wound up by one frame amount, said motor drive switch being mounted to a front portion of said main body and having contacting portions protruding forwardly of said main body so as to be in contact with said conductive layers.

8. A lens-fitted photographic film unit as recited in claim 7, wherein said contacting portions have resiliency for ensuring tight contact with said conductive layers.

9. A lens-fitted photographic film unit as recited in claim 8, wherein said motor unit further comprises a gear mechanism for transmitting rotational movement of said motor to said spool, a supporting frame for removably supporting said motor and said gear mechanism, and a top plate removably attached to said frame for holding top ends of axles of gear members of said gear mechanism.

10. A lens-fitted photographic film unit as recited in claim 9, wherein said supporting frame comprises upper and lower supporting portions having openings for fitting opposite end portions of said motor therein, and a resilient connecting portions connecting said supporting portions, said motor being clamped between said supporting portions due to the resiliency of said connecting portions.

11. A lens-fitted photographic film unit as recited in claim 10, wherein said gear mechanism is a speed-reduction gear mechanism for increasing torque supplied to said spool.

12. A lens-fitted photographic film unit as recited in claim 8, further comprising a flash unit removably mounted to a front portion of said main body, wherein said cell is commonly used for charging said flash unit, and said contact plates are incorporated into said flash unit.

13. A lens-fitted photographic film unit as recited in claim 8, further comprising an externally operable switch member for disconnecting said cell from said motor in an OFF position.

14. A lens-fitted photographic film unit as recited in claim 13, wherein said externally operable switch member is mounted on said front cover so as to connect or break one of said conductive layers which is arranged to connect one terminal of said motor to one of said contact plate.

15. A lens-fitted photographic film unit comprising:
a main body having a take-up chamber holding a container with a spool and a film supply chamber holding a roll of unexposed photographic film with one end secured to said spool so as to be wound into said container by rotating said spool;
a picture-taking mechanism mounted to a front of said main body, said picture-taking mechanism including a taking lens, a shutter button movable between a rest position and a depressed position and biased toward said rest position, a shutter blade, a shutter actuating lever for actuating said shutter blade to expose a frame on said photographic film, and an arresting lever which rotates in a first direction to release said shutter actuating lever from a cocked position upon depression of said shutter button, and rotates in a second direction to arrest said shutter actuating lever in the cocked position; and
a front cover removably attached to the front of said main body, the improvement comprising:
a winding gear mounted atop of said take-up chamber and coupled to said spool;
a motor for rotating said spool through said winding gear;
a speed-reduction gear mechanism for transmitting rotational movement of said motor to said winding gear;
a pair of contacting portions connected to terminals of said motor and protruding forwardly of said main body;
a power source for supplying said motor;
a pair of contact plates mounted to a front portion of said main body for holding said cell therebetween, said contact plates respectively having contacting portions which protrude forwardly of said main body;
a motor drive switch actuated by said arresting lever so as to connect said motor to said cell after each exposure and disconnect said motor from said cell when said photographic film has been wound up by one frame amount, said motor drive switch being mounted to a front portion of said main body and having contacting portions protruding forwardly of said main body; and
a plurality of conductive layers formed on an inner surface of said front cover so as to be in contact with said contacting portions to provide a film winding circuit including said motor and said cell.

16. A lens-fitted photographic film unit as recited in claim 15, wherein said contacting portions have resiliency for ensuring tight contact with said conductive layers.

17. A lens-fitted photographic film unit as recited in claim 16, wherein said motor drive switch comprises:
a switching lever which rotates in conjunction with said arresting lever;
a first resilient contact strip actuated by said switching lever; and
second and third resilient contact strips disposed on opposite sides of said first contact strip and isolated from one another, said first contact strip being bent by said switching lever into contact with said third contact strip when said arresting lever rotates in said second direction, and resiliently returning to an initial position when said arresting lever rotates in said first direction, said second contact strip being bent toward said first contact strip while said shutter button is in said rest position, so as to come into contact with said first contact strip when said first contact strip returns to said initial position, wherein said motor is driven when said first and second contact strips come into contact with each other, and is short-circuited to be braked when said first and third contact strips come into contact with each other.

18. A lens-fitted photographic film unit as recited in claim 17, wherein said front cover has a top wall portion for covering top side of said main body, and said shutter button is mounted on said top wall portion and actuates said arresting lever through an interconnection mechanism which is incorporated into said front cover.

19. A lens-fitted photographic film unit as recited in claim 18, wherein said second contact strip is bent toward said first contact strip by said interconnection mechanism when said shutter button is in said rest position.

20. A lens-fitted photographic film unit as recited in claim 19, wherein said interconnection mechanism comprises an interconnecting lever mounted on an axle formed on the inner surface of said front cover to be rotatable upon depression of said shutter button, and a release lever formed integrally with the top wall of said front cover to be resiliently bent by said interconnecting lever so as to rotate said arresting lever in said first direction.

21. A lens-fitted photographic film unit as recited in claim 17, wherein said first to third contact strips are held in a block made of an isolating material, said block being removably attached to a front of said take-up chamber, one ends of said strips being exposed to a front side of said block to form said contacting portions, the opposite ends being actuated to contact each other.

22. A lens-fitted photographic film unit as recited in claim 21, further comprising an externally operable switch member which actuates said switching lever to bend said first contact strip toward said third contact strip to keep said first contact strip apart from said second contact strip in an OFF position.

23. A lens-fitted photographic film unit as recited in claim 22, wherein said motor and said speed-reduction gear mechanism are rotatably held in a supporting frame, and a top plate is removably attached to said supporting frame to maintain predetermined spacings between axes of gear members of said gear mechanism, said supporting frame being removably mounted on one side of said take-up chamber of said main body.

24. A lens-fitted photographic film unit as recited in claim 23, wherein said externally operable switch member is slidably mounted on said top plate, and said switching lever is pivotally mounted on a top portion of said take-up chamber.

25. A lens-fitted photographic film unit as recited in claim 15, wherein said motor is a direct current motor, and said main body has a projection which is disposed in proximity to one of said contact plates so as to allow a positive terminal of said cell to be connected to said one contact plate, and prevent a negative terminal of said cell from connecting to said one contact plate.

26. A lens-fitted photographic film unit as recited in claim 15, wherein said power source is a cell capable of supplying 1.5 V voltage.

27. A lens-fitted photographic film unit as recited in claim 26, further comprising a flash unit removably mounted to a front portion of said main body, wherein said cell is commonly used for charging said flash unit, and said contact plates are incorporated into said flash unit.

* * * * *